United States Patent
Maurice

(10) Patent No.: US 12,474,306 B2
(45) Date of Patent: Nov. 18, 2025

(54) METHOD AND SYSTEM FOR IMAGING A TARGET FROM COHERENT WAVES

(71) Applicant: VALPIREC, Draguignan (FR)

(72) Inventor: Francois Maurice, Draguignan (FR)

(73) Assignee: VALPIREC, Draguignan (FR)

( * ) Notice: Subject to any disclaimer, the term of this patent is extended or adjusted under 35 U.S.C. 154(b) by 361 days.

(21) Appl. No.: 18/043,291

(22) PCT Filed: Aug. 31, 2021

(86) PCT No.: PCT/EP2021/074028
§ 371 (c)(1),
(2) Date: Feb. 27, 2023

(87) PCT Pub. No.: WO2022/043584
PCT Pub. Date: Mar. 3, 2022

(65) Prior Publication Data
US 2024/0027406 A1    Jan. 25, 2024

(30) Foreign Application Priority Data

Aug. 31, 2020 (FR) ....................... 2008821

(51) Int. Cl.
*G01N 29/34* (2006.01)
*G01N 29/44* (2006.01)
*G01N 29/50* (2006.01)

(52) U.S. Cl.
CPC ....... *G01N 29/348* (2013.01); *G01N 29/4463* (2013.01); *G01N 29/449* (2013.01); *G01N 29/50* (2013.01)

(58) Field of Classification Search
CPC ............ G01N 29/348; G01N 29/4463; G01N 29/449; G01N 29/50; G01N 2291/02466
See application file for complete search history.

(56) References Cited

U.S. PATENT DOCUMENTS

| | | |
|---|---|---|
| 5,010,885 A | 4/1991 | Fink et al. |
| 5,891,038 A | 4/1999 | Seyed-Bolorforosh et al. |

(Continued)

FOREIGN PATENT DOCUMENTS

| | | |
|---|---|---|
| EP | 0342757 A2 | 11/1989 |
| GB | 2461710 A | 1/2010 |

(Continued)

OTHER PUBLICATIONS

International Preliminary Report on Patentability received for PCT Patent Application No. PCT/EP2021/074028, mailed on Mar. 9, 2023, 17 pages (9 pages of English Translation and 8 pages of Original Document).

(Continued)

*Primary Examiner* — Xin Y Zhong
(74) *Attorney, Agent, or Firm* — WOMBLE BOND DICKINSON (US) LLP

(57) ABSTRACT

The present invention relates to an imaging method including the following steps—successively transmitting first and second waves in response to the successive application of first and second electrical excitation signals in separate first and second frequency bands contained in a range of excitation frequencies of the transmitter/receiver, receiving and converting respective first and second acoustic or electromagnetic echoes into respective first and second electrical reception signals, —digitising (100) the first and second electrical reception signals, —mixing (200) the first and second digital signals at different demodulation frequencies, —filtering (300) the first and second demodulated signals, —decimating (400) the first and second filtered signals.

15 Claims, 13 Drawing Sheets

(56) References Cited

U.S. PATENT DOCUMENTS 6,551,246 B1     4/2003   Ustuner et al.
2008/0110261 A1*   5/2008   Randall ............... G01S 7/52023
                                                                              73/64.41

FOREIGN PATENT DOCUMENTS

WO         02/35254 A1     5/2002
WO     2010/004333 A1     1/2010

OTHER PUBLICATIONS

International Search Report and Written Opinion received for PCT Patent Application No. PCT/EP2021/074028, mailed on Nov. 5, 2021, 19 pages (9 pages of English Translation and 10 pages of Original Document).

Montaldo et al., "Coherent Plane-Wave Compounding for Very High Frame Rate Ultrasonography and Transient Elastography", IEEE Transactions on Ultrasonics, Ferroelectrics, and Frequency Control, vol. 56, No. 3, Mar. 2009, pp. 489-506.

Perdios et al., "Deep Convolutional Neural Network for Ultrasound Image Enhancement", IEEE International Ultrasonics Symposium (IUS), Oct. 2018, 4 pages.

Sagar et al., "Influence of heart rate, preload, afterload, and inotropic state on myocardial ultrasonic backscatter", Laboratory Investigation Ultrasound, vol. 77, No. 2, Feb. 1988, pp. 478-483.

\* cited by examiner

METHOD AND SYSTEM FOR IMAGING A TARGET FROM COHERENT WAVES

FIELD OF THE INVENTION

This invention relates to the general technical field of imaging by transmission of waves of measurable phase, and in particular sound or ultrasound waves, or electromagnetic waves.

More precisely, this invention relates to a device and a method for imaging a target object, or a diffuse medium such as a biological, human or animal tissue.

In the remainder of this text, the invention will be described with reference to ultrasound medical imaging, it being understood that the teachings described here can be used in other types of application (non-medical ultrasounds, SONAR, RADAR, etc.) using waves of controllable amplitude, frequency and phase (i.e. coherent waves).

BACKGROUND OF THE INVENTION

1. Conventional Imaging System and Ultraportable Imaging System

Ultrasound imaging is used in many diagnostic procedures due to its non-invasive nature, its relatively low cost and the fact that it does not expose the patient to harmful ionizing radiation.

With reference to FIG. 1, the ultrasound imaging systems conventionally used comprise:
- an acoustic probe 1 including a plurality of transducers, and
- a control and processing console 2, in particular including:
  - processing means 21 for processing signals acquired by the probe,
  - input means 22 for configuring the imaging system, and
  - display means 23 for displaying an ultrasound image and/or other information relating to the target object such as the transmission of a sound or light signal, for example.

The probe 1 is connected to the console 2 by way of wired communication means 11—such as electrically conductive wires—to supply the probe 1 with electric power and transmit data between the probe 1 and the console 2.

The probe 1 includes an array of piezoelectric transducers which:
- in the transmission phase, receive electrical pulses and transmit excitation ultrasound waves (focused or unfocused waves) which they transmit in one or more given directions toward a target object, and according to one or more variable angles of incidence as a function of phase shifts or delays of the voltages applied to the different transducers, and
- in the reception phase, receive acoustic echoes due to the reflection of each incident ultrasound wave at the interface between regions of different acoustic impedance (which can be regions of different density at the interface of the target object).

The acoustic echoes received by the transducers are then converted into electrical signals and processed to compute the value of the echo of each point of the image and its position (for example by measuring the time elapsed between the transmission of the ultrasound wave and the reception of the acoustic echo).

Such conventional imaging systems have the advantage of disposing of considerable computational power, and of not being limited in the quantity of data that can be transmitted between the probe 1 and the console 2, since the latter is connected by wired communication means 11.

However, a major drawback of these conventional imaging systems relates to their bulk and in particular the management of the bulk of the wired connection between the probe and the console. Another drawback relates to the difficulties of updating such systems, since their hardware capabilities (memory, computing power etc.) are determined at the time of manufacturing.

In the past fifteen years, ultraportable ultrasound imaging systems have appeared. Such ultraportable imaging systems—of a size substantially equivalent to that of a smartphone—can be very easily transported. An ultraportable imaging system (or "ultraportable probe") particularly comprises an array of transducers for acquiring ultrasound signals, communication means, a memory and a computer.

Known ultraportable imaging systems of the prior art have an architecture that makes provision for image formation inside the ultraportable probe.

This has many drawbacks. Indeed, the execution of the image-forming processing in the ultraportable probe causes it to heat up, this heating being able to slow down the rate of formation of the echographic images, which is undesirable. In certain cases, moreover, the implementation of an imaging technique may require processing resources which exceed the capabilities of the computer of the ultraportable probe.

To remedy these drawbacks, the invention proposes to develop an ultraportable imaging system in which the echographic image is produced by a computing unit not contained in the probe.

It is then necessary to transmit the data acquired (and/or pre-processed) by the probe to the remote computing unit to produce the echographic images.

Whether this data transmission is implemented using wired or wireless communication means, accessible data transfer rates are typically 100 times less than those of conventional imaging systems. It is therefore preferable to minimize the quantity of data transmitted between the ultraportable probe and the remote computing unit, while allowing the obtainment of echographic images of an equivalent (or even higher) quality than the quality of an echographic image obtained from a conventional ultrasound imaging system.

In addition to the spatial resolution, the quality of an echographic image of a target object also depends on two parameters:
- the Signal-to-Noise Ratio; and
- the contrast resolution.

2. Known Solutions for Improving the Quality of an Echographic Image

2.1. Focused Imaging

To improve the quality of an echographic image of a target object, a first technique is known consisting in focusing the ultrasound waves transmitted by the transducers 12 on a point of interest 3.

More precisely and with reference to FIG. 2, by selecting the delay (or phase) and amplitude of the excitation voltages applied to the transducers 12, the latter may be controlled to produce ultrasound waves combining to form a resultant ultrasound wave 13 which focuses on a point of interest 3 with good spatial resolution.

Each shot (i.e. transmission/reception by all the transducers) therefore makes it possible to obtain an item of information concerning a focal point of interest 3, and it is necessary to repeat this operation at different points of interest to obtain a complete echographic image of the target object. By way of illustration, a complete echographic image produced from focused shots can require 64 to 256 shots (or even more).

For each shot, the spread function of the round trip point is the product of that of transmission by that of reception, which makes it possible to improve the contrast. In fact, since the transmission and reception are both concentrated in a narrow area, a hypoechogenic area has fewer chances of receiving interference signals from neighboring echogenic areas ("clutter") which contributes to keeping the contrast close to its actual value.

The Signal-to-Noise Ratio is high in the focusing area (concentration of the ultrasound energy along a line), and can be further optimized, firstly by increasing the excitation voltage (within the limits permitted by the safety regulations or by the hardware), and secondly by accumulating shots having the same parameters (if there is no thermal limit).

The cumulative signal increases with the number of similar shots, and the noise—assumed random—increases with the square root of the number of shots. The intensity of the Signal-to-Noise Ratio therefore also increases as the square root of the number of shots.

One drawback of this technique relates to the large number of shots needed to form a complete echographic image of the target object (typically 64 to 256 shots are necessary to form a complete image of the target object).

This technique is therefore not suitable in the event of an ultraportable imaging system with remote computing means, since the quantity of data that have to be transmitted between the acquiring probe and the remote computing unit would be too large.

2.2. Synthetic Imaging

Another known imaging technique used to potentially reduce the number of transmission-and-receptions is synthetic imaging, which consists in transmitting one or more plane (or spherical, or divergent or specified by spatiotemporal codes, or with a deep focal point to allow a less finely-focused beam) ultrasound waves toward the target object. For the axial resolution to be maximal, the excitation signal applied to each transducer is generally a signal of short duration and wide bandwidth.

Unlike focused imaging, synthetic imaging makes it possible to obtain a complete echographic image from the first shot when this shot is an excitation illuminating the entire medium.

To improve the quality of the echographic image of a target object, provision has already been made for transmitting several plane (or spherical, or divergent) ultrasonic waves toward the target object along different angles.

More precisely and with reference to FIG. 3, as a function of the phase and amplitude of the excitation voltages applied to the transducers 12, it is possible to control the transducers 12 for them to produce ultrasound waves combining to form a resultant plane ultrasound wave 14 which propagates through the tissue to be imaged along a desired direction 15. This plane resultant ultrasound wave 14 is transmitted at different angles (i.e. different directions) to improve the lateral resolution (by synthesis in transmission), contrast and Signal-to-Noise Ratio.

In fact, as the resultant ultrasound wave 14 is not focused, the spread function of the round trip point (PSF or Point Spread Function) suffers from this lack of focusing in transmission, and the contrast of each image obtained from one shot is lower than with the conventional focused imaging technique described in section 2. Similarly, the intensity values of the received signal are also lower due to the absence of focusing, such that the Signal-to-Noise Ratio is also lower than with the conventional focused imaging technique described in point 2.

To improve both the Signal-to-Noise Ratio and the contrast, it is a known practice to coherently add elementary images reconstructed by beamforming, each elementary image being obtained from a respective oriented resultant wave 14, i.e. a wave transmitted along a respective direction (i.e. a respective angle). In other words, with each oriented shot (i.e. transmission/reception by all the transducers 12), an elementary image is reconstructed by beamforming. The addition of these different elementary images makes it possible to obtain a final echographic image of the target object.

With this synthetic imaging technique, the signal is substantially proportional to the number of elementary images (or the number of angles) while the noise is proportional to the square root of the number of elementary images (or number of angles): the Signal-to-Noise Ratio and the contrast therefore also increases as the square of the number of elementary images (or number of angles).

The synthetic imaging technique makes it possible to obtain a Signal-to-Noise Ratio and contrast substantially equivalent to (or overall better over the whole image), than with the focused imaging technique, while limiting the number of shots necessary to form a final echographic image of the object of interest (typically 10 to 40 shots are necessary in synthetic imaging, while 64 to 256 shots are necessary in focused imaging).

However, a significant drawback of the synthetic imaging technique by comparison with the focused imaging technique is that the operation of reconstructing the elementary images by beamforming (and the number of associated computations) is also multiplied by the number of shots (10-40).

The synthetic imaging technique described above based on an array of transducers 12 each excited by a wideband pulsed signal is therefore not suitable either for ultraportable imaging systems for which computational power is limited.

3. Narrowband Echographic Imaging

To improve the quality of an echographic image of a target object, provision has already been made, in focused imaging, for using several narrowband excitation signals rather than one wideband pulsed signal.

The document U.S. Pat. No. 5,891,038 in particular makes provision for a method of processing of ultrasound signals making it possible to improve the sensitivity of an ultrasound imaging system including a plurality of transducers.

The method comprises:
the transmission of a first focused ultrasound wave having a first frequency band centered on a first frequency by exciting transmitter transducers of the imaging system during a first time interval,
the transmission of a second focused ultrasound wave having a second frequency band centered on a second frequency different from the first frequency, by exciting transmitter transducers of the imaging system during a second time interval,
the formation of a first pair of complex signals based on first echo signals received by receiver transducers of the imaging system, the first echo signals received being representative of a portion of the first ultrasound wave backscattered toward the receiver transducers, the formation of a second pair of complex signals based on second echo signals received by the receiver transducers of the imaging system, the second signals received being representative of a portion of a second ultrasound wave backscattered toward the receiver transducers, the filtering of the first and second pairs of complex signals, and the summation of the first and second pairs of complex signals filtered to form a complex resultant signal having components representing the sum of the respective components of the first and second pairs of complex signals.

This technique consisting in successively transmitting narrowband signals with the same transducer(s), and in coherently summing the echo responses thereof, makes it possible to obtain a resultant signal:

of wider band than each transmitted component, but of an overall band that is of course located inside that of the transducer, of better Signal-to-Noise Ratio than that obtained by directly using a wideband excitation signal of the same amplitude.

However, even if this technique makes it possible to improve the Signal-to-Noise Ratio and the axial resolution of the ultrasound imaging device, it is not optimal in the context of an ultraportable imaging system with remote computing means, since the quantity of data that has to be transmitted between the acquiring probe and the remote computing unit is not small enough.

4. Aim of the Invention

One aim of this invention is to make provision for a method and system of ultrasound imaging making it possible to remedy at least one of the aforementioned drawbacks. More precisely, an aim of this invention is to make provision for a method and a system making it possible to limit the quantity of data transmitted by an acquiring probe toward a remote processing device, while retaining good image quality in terms of Signal-to-Noise Ratio and penetration and also in terms of contrast.

BRIEF DESCRIPTION OF THE INVENTION

For this purpose, the invention makes provision for a method of processing of acoustic or electromagnetic signals (light signals, microwave signals, etc.) recorded by a receiver, said acoustic or electromagnetic signals being representative of acoustic or electromagnetic waves reflected by a medium to be studied after reflection off said medium of acoustic or electromagnetic waves transmitted by a transmitter to illuminate the medium to be studied, noteworthy in that the method comprises the following steps:

the successive transmission, by the transmitter, of first and second waves in response to the successive application to the transmitter, of first and second electrical excitation signals in first and second separate frequency bands contained in a range of excitation frequencies of the transmitter, the frequency band of each of the first and second electrical excitation signals, as measured based on a −6 dB bandwidth, being less than a quarter of the frequency range of the transmitter, the reception, by the receiver, of first and second acoustic or electromagnetic echoes due to the respective reflections of the first and second waves at the interface of a target object contained in the medium to be studied, and the conversion of the first and second acoustic or electromagnetic echoes into respective first and second electrical reception signals, the pre-processing of the first and second electrical reception signals to obtain pre-processed signals, the pre-processing consisting in:

the digitization of the first and second electrical reception signals to obtain first and second digital signals, at least one mixing of the first and second digital signals to obtain first and second mixed signals, the mixing frequency of the first digital signal being different from the mixing frequency of the second digital signal, at least one low-pass filtering of the first and second mixed signals to obtain first and second filtered signals, the cut-off frequency of the low-pass filter, as measured based on a −6 dB bandwidth, being less than an eighth of the frequency range of the transmitter, at least one decimation of the first and second filtered signals to obtain first and second decimated signals characterized by a flow rate of demodulated and decimated complex samples less than half the frequency range of the transmitter.

The reader will appreciate that in certain variant embodiments, the transmitter and the receiver consist in two separate entities (each entity being able to include one or more hardware elements):

one of the entities allowing the transmission of acoustic waves (such as one or more truck-mounted vibrators, or one or more sonars) or electromagnetic waves (such as one or more RADAR receivers), and the other allowing the reception of acoustic waves (such as a geophone or a hydrophone) or electromagnetic waves (such as one or more RADAR receivers).

In other variant embodiments the transmitter and the receiver consist in a single entity (such as one or more piezoelectric transducers) allowing both the transmission and the reception of acoustic waves.

In the context of this invention, the term "separate frequency bands" should be understood to mean frequency bands not overlapping in their entirety, while nonetheless able to partially overlap.

Preferred but non-limiting aspects of the method according to the invention are as follows:

advantageously, for the step of demodulation of the first and second digital signals:

each mixing frequency of the first digital signal may be chosen equal to:
the center frequency of the first frequency band, or to
a harmonic of the first frequency band, or to
a sub-harmonic of the first frequency band, each mixing frequency of the second digital signal can be chosen equal to:
the center frequency of the second frequency band, or to
a harmonic of the second frequency band, or to
a sub-harmonic of the second frequency band;

the first and second electrical excitation signals may each consist in an electrical signal of temporally apodized type;

the transmitter can be suitable for transmitting waves along different propagation directions, the step of successive transmission of the first and second waves including sub-steps consisting in:

transmitting the first wave only along a first direction, and transmitting the second wave only along a second direction different from the first direction;

Of course the first and second waves may be plane, spherical, or be generated based on arbitrary delay laws (profile of the triggering times of the excitation signals applied to the transducers), generally continuous. In the case above, the delay laws are different (the reader will appreciate that in other variants of the invention, these delay laws may be identical for the first and second waves).

the transmitter may include a set of transducers extending linearly, the step of transmission of the first and second waves including the sub-steps consisting in:

transmitting the first wave from a first group of transducers of the set of transducers, transmitting the second wave from a second group of transducers of the set of transducers, the second group of transducers being different from the first group of transducers;

the method may further comprise a step of transmission, by the receiver, of the pre-processed signals to a remote processing device;

advantageously:

the transmission step may comprise the transmission of N waves in response to the successive application of N electrical excitation signals in N separate frequency bands contained in the frequency range of the transmitter, N being an integer greater than or equal to 3, the reception step may comprise the receiving of N acoustic or electromagnetic echoes and their conversion into N respective electrical reception signals, the preprocessing step may comprise:

the digitization of the electrical reception N signals to obtain N digital signals, the mixing of each digital signal to obtain a mixed signal, the mixing frequency of each digital signal being equal to the center frequency, to a harmonic or to a subharmonic of the frequency band of its associated excitation signal, the low-pass filtering of each mixed signal to obtain a filtered signal, the decimation of each filtered signal to obtain a decimated signal, the method further comprising a step of processing to obtain an image of the medium to be studied, said processing step including:

a sub-step of formation of an elementary image based on each decimated signal, said step of formation of an elementary image including the computation of points extending over a 2D surface or a 3D volume using the information contained in the decimated signal, a sub-step of cross-modulation consisting in transferring each elementary image formed to a common reference frequency, and a sub-step of summation of the cross-modulated elementary images to obtain a final image of the medium to be studied.

The invention also relates to a system for processing acoustic or electromagnetic signals recorded by a receiver, said acoustic or electromagnetic signals being representative of acoustic or electromagnetic waves reflected by a medium to be studied after reflection off said medium of acoustic or electromagnetic waves transmitted by a transmitter to illuminate the medium to be studied, noteworthy in that the system comprises:

a controller to control:

the successive transmission of first and second waves in response to the successive application to the transmitter, of first and second electrical excitation signals in first and second separate frequency bands contained in a range of excitation frequencies of the transmitter, the frequency band of each of the first and second electrical excitation signals, as measured based on a −6 dB bandwidth, being less than a quarter of the frequency range of the transmitter, the reception, by the receiver, of first and second acoustic or electromagnetic echoes due to the respective reflections of the first and second waves at the interface of a target object contained in the medium to be studied, and the conversion of the first and second acoustic or electromagnetic echoes into respective first and second electrical reception signals, an acquiring unit for preprocessing the first and second electrical reception signals in order to obtain preprocessed signals, the preprocessing consisting in:

the digitization of the first and second electrical reception signals to obtain first and second digital signals, the mixing of the first and second digital signals to obtain first and second mixed signals, the mixing frequency of the first digital signal being different from the mixing frequency of the second digital signal, the low-pass filtering of the first and second mixed signals to obtain first and second filtered signals, the cut-off frequency of the low-pass filter, as measured based on a bandwidth at −6 dB, being less than an eighth of the frequency range of the transmitter, the decimation of the first and second filtered signals to obtain first and second decimated signals characterized by a flow rate of complex demodulated and decimated samples less than half of the frequency range of the transmitter.

The invention also relates to a computer program product comprising program code instructions intended to execute the steps of the method described above when said program is executed on a computer.

BRIEF DESCRIPTION OF THE DRAWINGS

Other advantages and features of the method and of the probe according to the invention will become more apparent from the following description of several different embodiments, given by way of non-limiting example, based on the appended drawings wherein.

DETAILED DESCRIPTION OF THE INVENTION

There will now follow a more detailed description of examples of probes and methods according to the invention with reference to the figures. In these various figures, equivalent elements are denoted by the same reference number.

1. Ultrasound Imaging System

1.1. General

Figure 4:
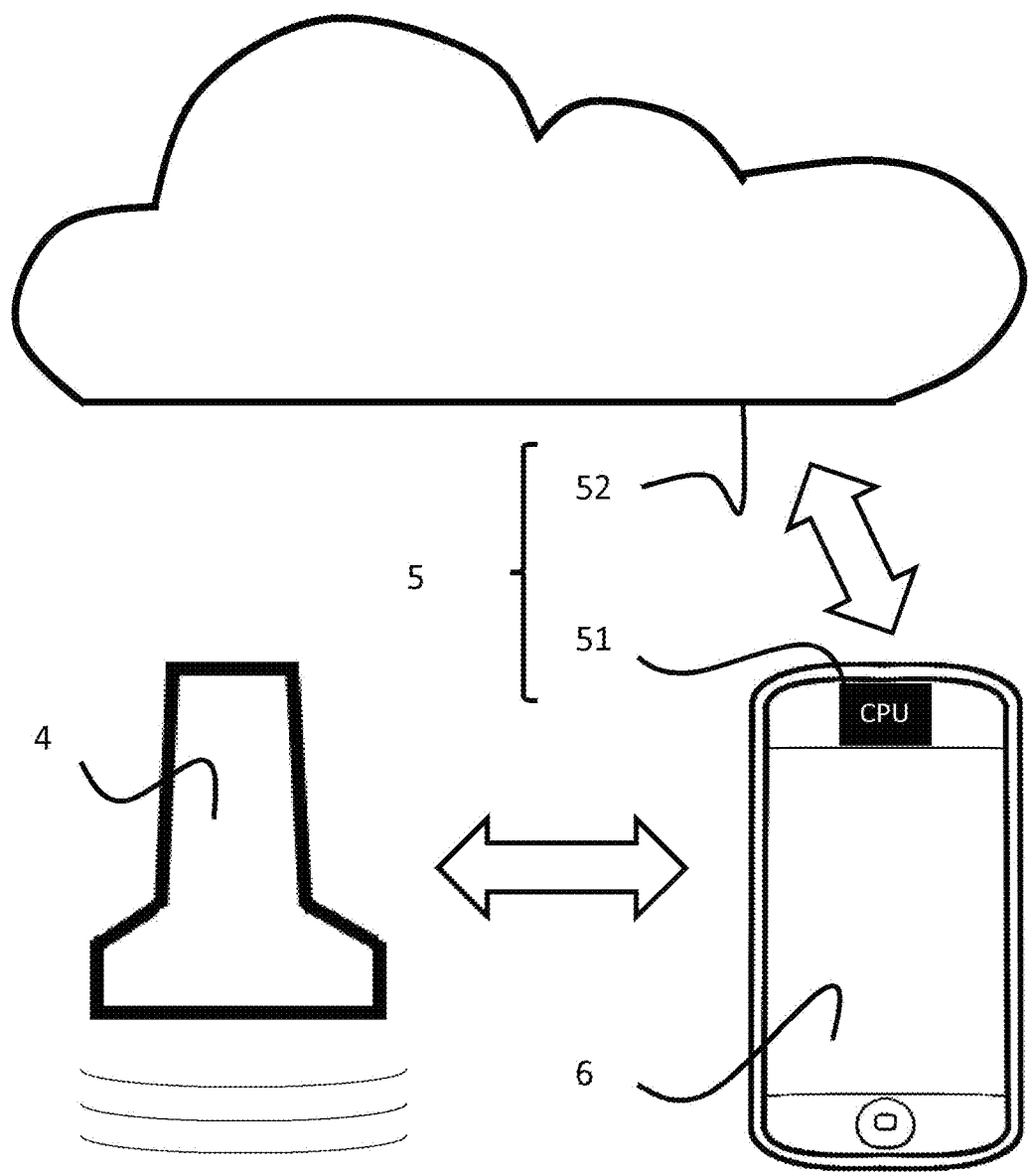
FIG. 4 is a schematic representation of an ultrasound imaging system including an acquiring probe, one or more remote computing units and one or more remote display units.

FIG. 4 illustrates an example of an ultrasound imaging system according to the invention. This system comprises:
- a data-acquiring probe 4 forming an ultraportable imaging device,
- an external computing unit 5 for processing data transmitted by the probe 4,
- a display unit 6 for displaying an echographic image of a target object and/or information relating to the imaged object.

Exchanges of data between the probe 4 and the external computing unit 5 may be done using wired or wireless communication means. Exchanges of data between the external computing unit 5 and the display unit 6 may be done using wired or wireless communication means.

In certain embodiments, the display unit 6 may be incorporated into the external computing unit 5. For example, the display unit 6 may consist in the screen of a smartphone and the external computing unit 5 may consist in the central unit 51 (processor, memory, etc.) of the Smartphone.

In a variant, the external computing unit 5 can be entirely dissociated from the display unit 6. For example, the external computing unit 5 may consist in one or more computer networks of a network 52—such as the Internet—and the display unit 6 may consist in the screen of a Smartphone. The use of cloud computing makes it possible to have access to a very large amount of computing power, particularly for the implementation of signal processing algorithms requiring the use of hardware resources having a computing power greater than that of a Smartphone.

In another variant, the external computing unit 5 can be partly dissociated from the display unit 6. For example, the computing unit 5 can be composed:
- firstly of the central unit 51 (processor, memory, etc.) of a Smartphone, for example for the implementation of processes requiring low computing power, and for which the user wishes to have access to results that can be displayed on the display unit 6 in real time (B-Mode imaging, etc.),
- secondly of one or more computer servers of a network 52 for the implementation of processes requiring a large amount of computing power, and for which the user does not wish to have access to any results displayable in real time (elastography etc.).

Thus, the ultrasound imaging system is composed of an ultrasound probe 4 hosting all the acquiring electronics and sending the acquired data (where applicable preprocessed) to the computing unit 5 (remote computer and/or tablet and/or smartphone etc.) for the reconstruction of the elementary images by beamforming or another image reconstruction technique, and the generation of a final echographic image of the target object. Since the reconstruction by beamforming is not implemented in the probe 4, it consumes less energy than ultraportable imaging systems incorporating internal processing means, and offers better performance.

1.2. Probe

Figure 5:
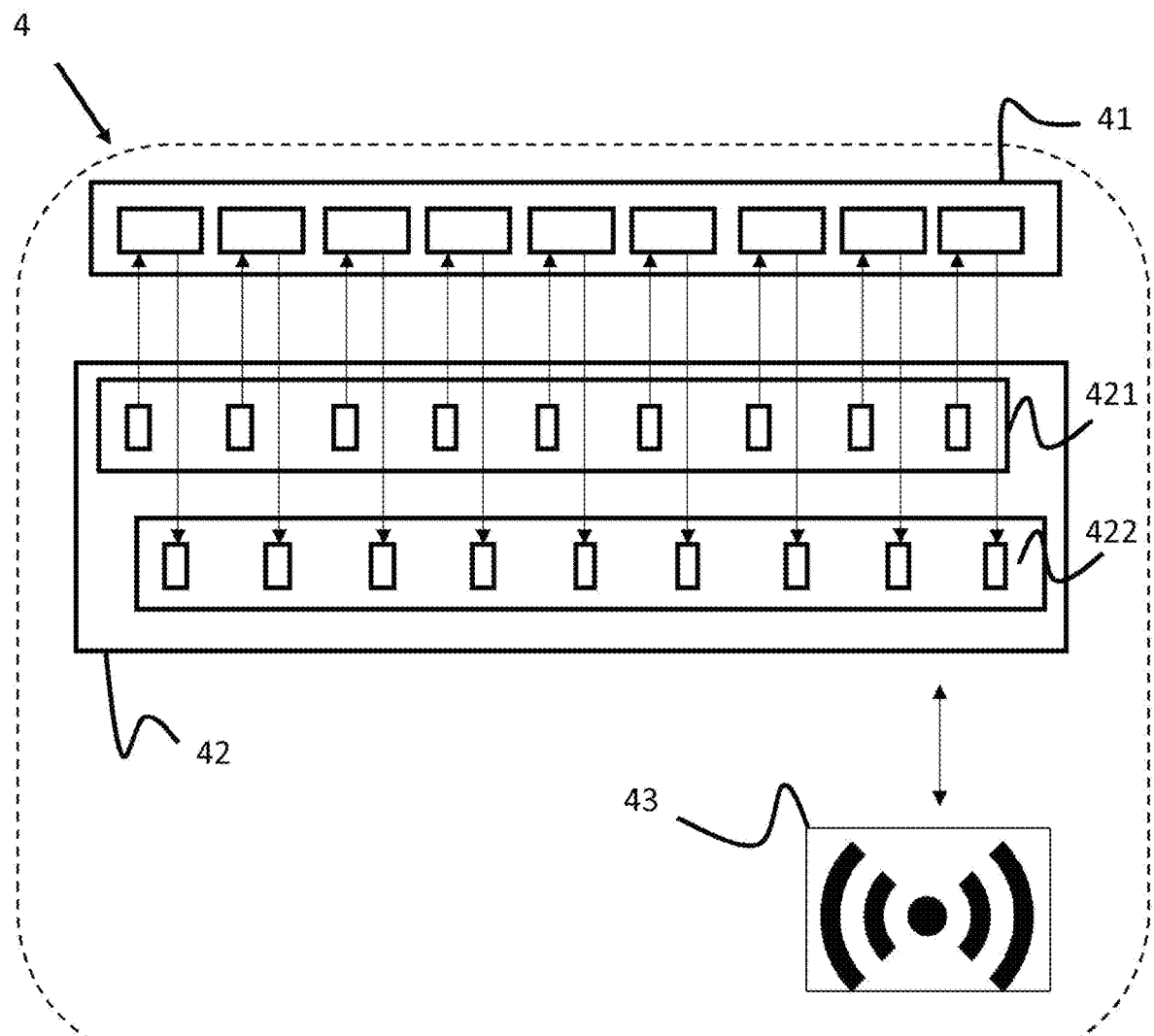
FIG. 5 is a schematic representation of stages of transmission and reception of the acquiring probe.

With reference to FIG. 5; the probe 4 comprises:
- a set of "n" ultrasound transducers 41 ("n" being an integer, for example between 1 and 1024 in the case of a linear or curved probe, but also able to be applied to a matrix probe with several thousand transducers),
- an acquiring unit 42 including:
  - a transmission stage 421,
  - a reception stage 422,
- a communication unit 43 (wired or wireless) to:
  - where applicable, compress (using any compression method known to those skilled in the art) data from the reception stage 422, and
  - transmit data (compressed or not) to the external processing means.

The set of transducers 41 is used to transmit ultrasound excitation waves to a medium toward a medium to be explored (organ, biological tissue, etc.) and to receive acoustic echoes (i.e. ultrasound waves reflected by the different interfaces of the medium to be explored). Each transducer consists for example in a plate of piezoelectric material of rectangular shape coated with electrodes on its front and rear faces. Such transducers are known to those skilled in the art and will not be described in further detail in the remainder of the text.

In the variant embodiment illustrated in FIG. 5, all the transducers of the set 41 are used both for transmission and for reception. In other embodiments, separate transducers can be used for the transmission and reception. For example, all the transducers of odd rank of the set (1, 3, 5, etc.) can be used exclusively for transmission, while all the transducers of even rank of the set (2, 4, 6, etc.) are used exclusively for reception.

The acquiring unit 42 is connected to the set of ultrasound transducers 41. It is used to drive the transducers of the set 41, and to process the data acquired by the transducers of the set 41. More precisely, the transmission stage 421 of the acquiring unit 42 makes it possible to control the transmission of ultrasound waves toward the medium to be explored. The reception stage 422 of the acquiring unit 42, meanwhile, is used to receive the signals acquired by the transducers and to preprocess them, as will be described in more detail in the remainder of the text. Provision can be made for an interface circuit between the transmission 421 and reception 422 stages to selectively connect one or the other of these stages to the set of transducers 41 and to avoid, in particular, the blinding of the reception stage 422 by the transmission stage 421.

The transmission stage 421 comprises one or more generators of excitation signals connected to one or more delays which determine the trigger times of the excitation signal associated with each transducer, for example to direct the ultrasound waves diagonally with respect to the plane of the set of transducers 41.

The reception stage 422 comprises an amplifier receiving the electrical signals corresponding to the ultrasound echoes received by the transducers of the set 41.

1.3. Problem Associated with the Imaging System

Figure 1:
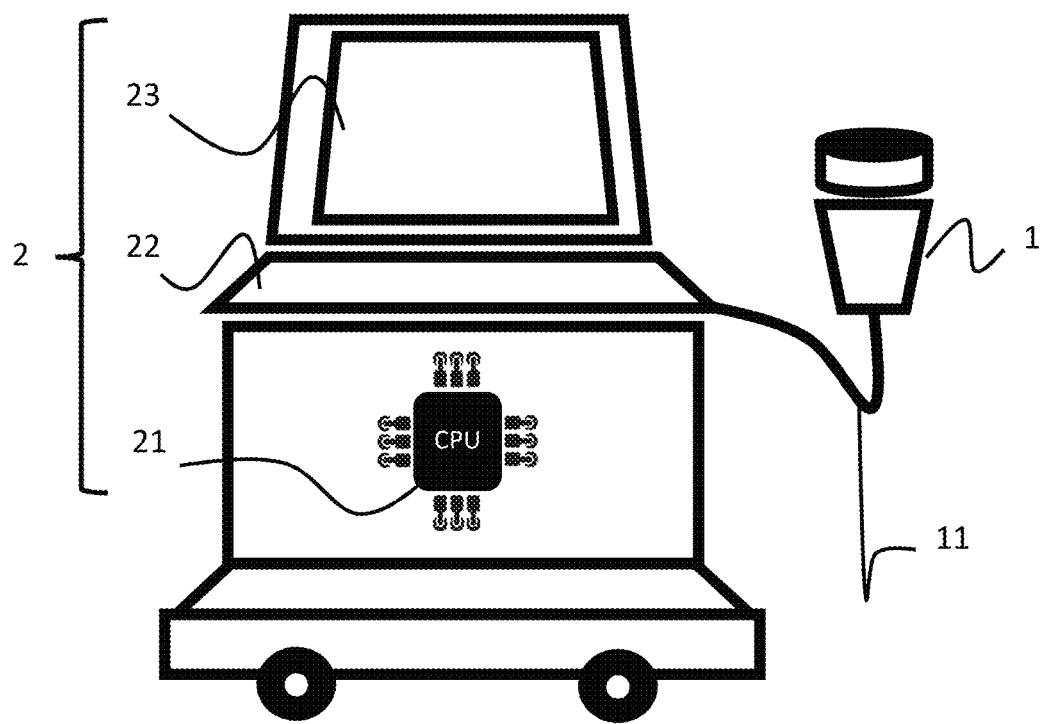
FIG. 1 is a schematic representation of an ultrasound imaging system of the prior art incorporating a probe and a processing console.
Figure 2:
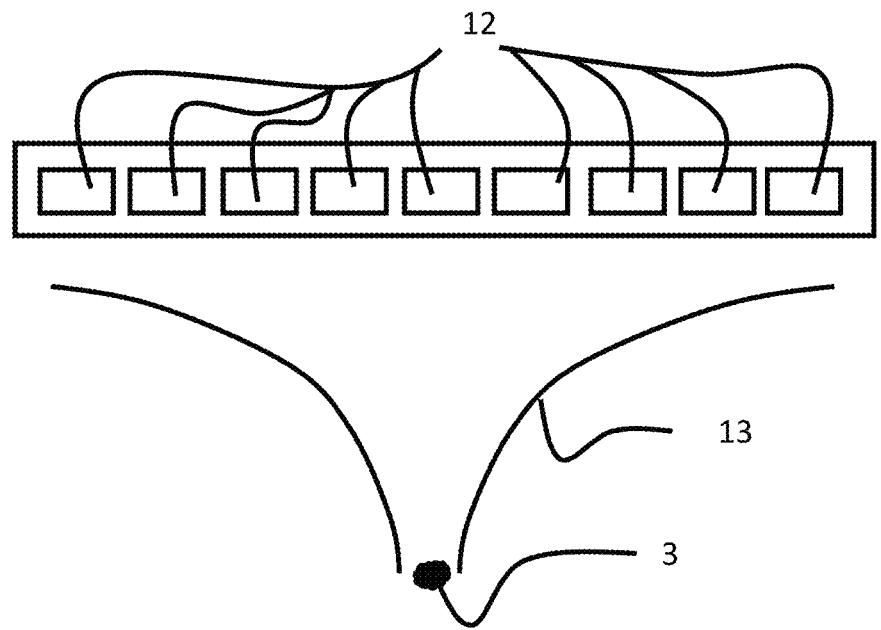
FIG. 2 is a schematic representation of the focused imaging principle.
Figure 3:
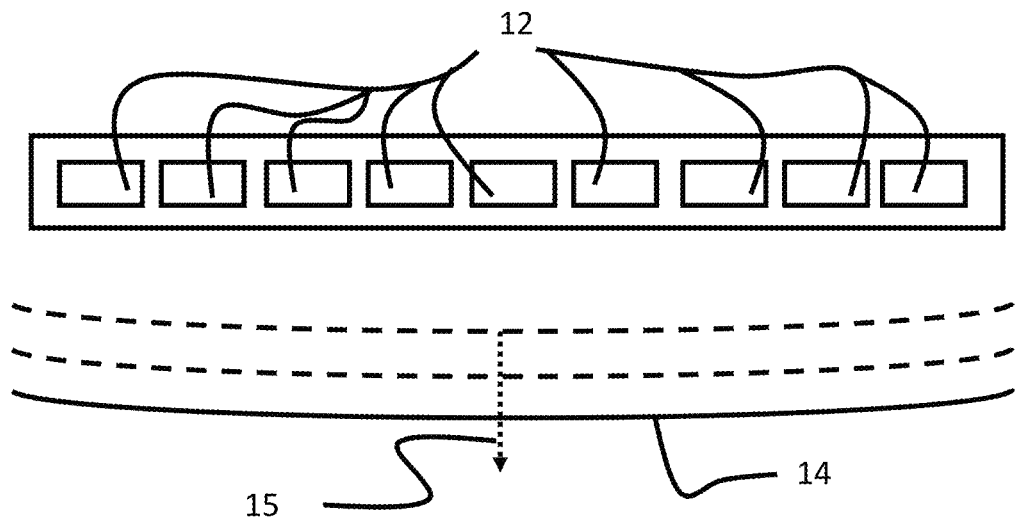
FIG. 3 is a schematic representation of the synthetic imaging principle.

The architecture chosen for the imaging system described in section 1 imposes certain limitations:

the quantity of data transmitted by the probe must be as small as possible (indeed, current wireless communication means have a data transmission rate far lower (in particular 100 times lower) than the data flow rate practically achievable between an acquiring unit and its close peripherals—such as a graphics card—of a conventional imaging system as illustrated in FIG. 1), the number of computations performed by the external computing unit must be as small as possible, firstly to limit the necessary computing power (and therefore the consumption of electrical power) in the case of a smartphone for example, and secondly to reduce the time necessary to obtain a result, the quality of the echographic image (and therefore the contrast and the Signal-to-Noise Ratio) must be as high as possible.

In view of these various limitations, the technique of focused imaging along each of the rows of the image cannot be implemented, since this technique requires too many shots to form the complete echographic image of the target object. A solution based on an improvement of the synthetic imaging technique must therefore be adopted. This technique can be used by sending non-finely-focused waves (plane or divergent waves) but also by illuminating an equivalent of a "fat beam" not covering the entire image field. Firstly to reduce the quantity of data to be transferred to the external processing means, and secondly to limit the number of operations needed for the reconstruction of the elementary images by beamforming, the number of shots must be limited (typically 5 shots at different angles) by comparison with the conventional synthetic imaging technique (for which 10 to 40 shots are needed to form a final echographic image comparable in quality to a focused image).

Finally, the influence of the small number of shots on the quality of the final echographic image must be limited for the performance of the imaging system to be acceptable.

Taking these various limitations into account, the inventor has developed the solution described in the remainder of the text and implemented in the transmission 421 and reception 422 stages of the probe. This solution is based on an improvement of the narrowband imaging technique.

2. Synthetic Ultrasounds Based on Narrow Sub-Bands

The aim of the solution described in the remainder of the text is to allow the obtainment of a final echographic image from elementary echographic images acquired at different angles:

while limiting the quantity of data to be transferred from the probe 4 toward the computing unit 5, as well as the number of computations to be carried out by the computing unit 5 to generate the elementary echographic images by beamforming.

and while preserving an adequate Signal-to-Noise Ratio and contrast to obtain a final echographic image of good quality that can be displayed on the display unit 6.

For this purpose, the solution described in the remainder of this text comprises the implementation of different steps:

i) the successive transmission by the probe of (at least) first and second ultrasound waves in response to the successive application of first and second electrical excitation signals in at least first and second narrow and separate frequency bands contained in the excitation frequency range of the transducer, ii) the reception by each transducer of (at least) first and second acoustic echoes due to the respective reflections of the first and second ultrasound waves at the interface of a target object, and the conversion of the first and second acoustic echoes into respective first and second electrical reception signals, iii) the pre-processing of the first and second electrical reception signals for each transducer, the pre-processing consisting in:
   a. the digitization of the first and at least second electrical reception signals to obtain first and second digital signals,
   b. the mixing of each first and at least second digital signal to obtain first and second mixed signals,
   c. the low-pass filtering of each first and second mixed signal to obtain first and second filtered signals,
   d. the decimation of each first and second filtered signal to obtain first and second decimated signals.

All these steps are implemented in the probe:

the step "i" is implemented in the transmission stage 421 of the probe 4, and the steps "ii to iii" are implemented in the reception stage 422 of the probe 4.

2.1. Step i) of Transmission Based on Narrowband Excitation Signals

The probe, composed of a plurality of transducers, is able to transmit a plurality of ultrasound waves (plane or divergent (in particular spherical)) in sequence, each ultrasound wave being transmitted in response to the application of a respective excitation signal having an energy spectrum centered on a center frequency different from the center frequencies of the energy spectra associated with the other excitation signals for the generation of the other ultrasound waves of the plurality.

Figure 6:
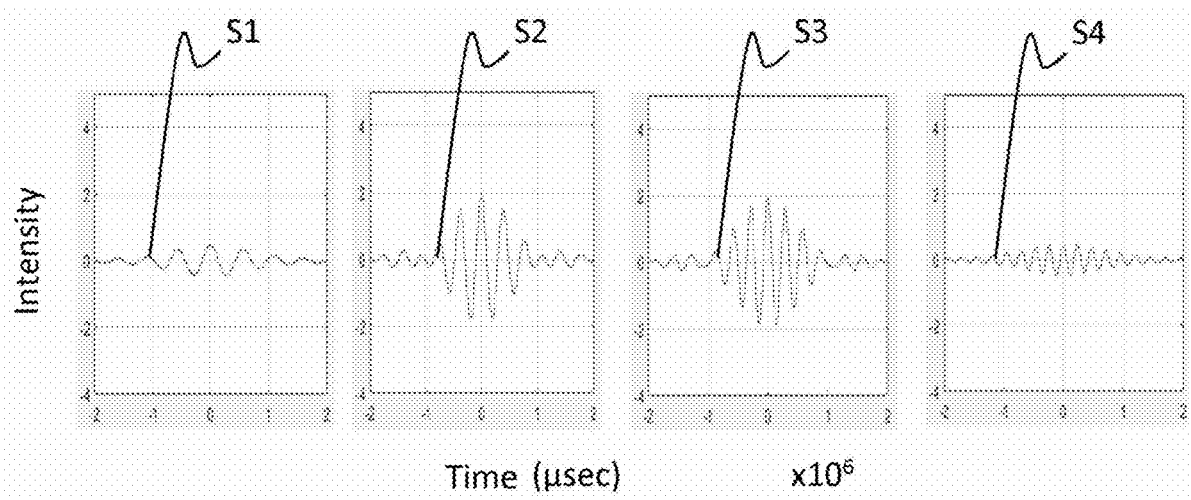
FIG. 6 is a schematic representation of a plurality of excitation signals in narrow frequency bands able to be applied to transducers of the acquiring probe.
Figure 7:
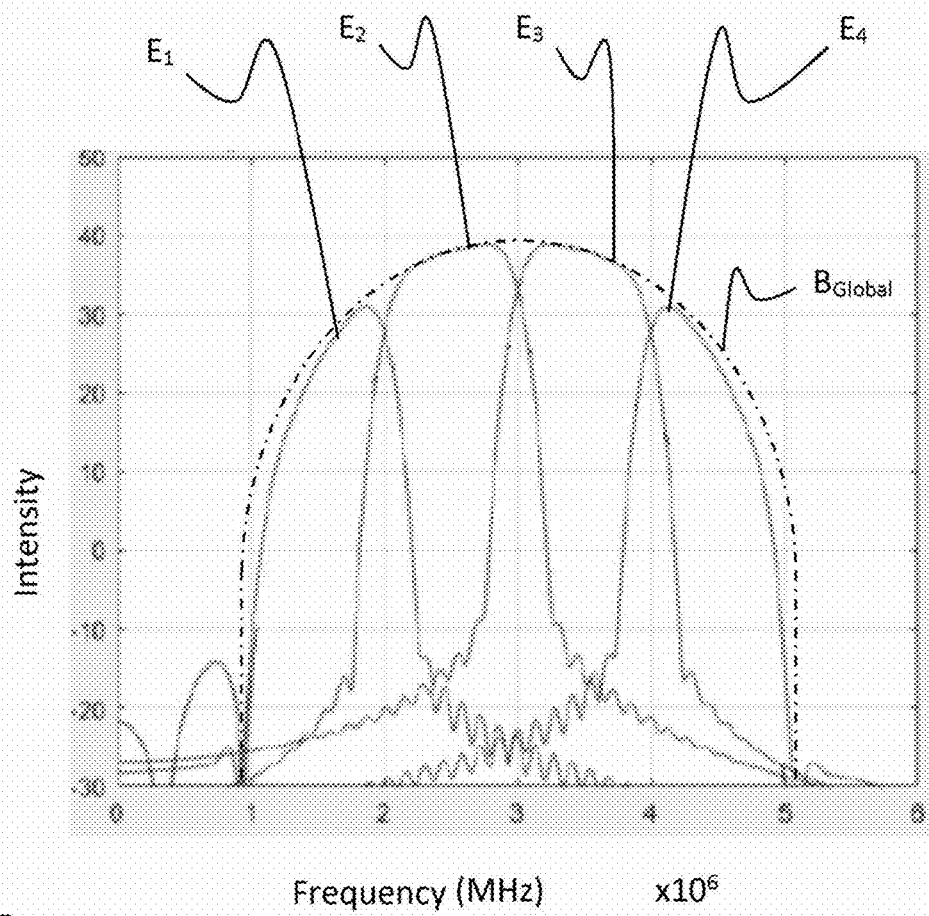
FIG. 7 is a schematic representation of the energy spectra of the excitation signals shown in FIG. 6.

For example with reference to FIGS. 6 and 7, each transducer can be adapted to successively transmit four ultrasound waves in response to the successive application of four excitation signals S1, S2, S3, S4 (see FIG. 6) each having an energy spectrum in its own narrow band E1, E2, E3, E4 (see FIG. 7).

In other words, for each excitation signal S1-S4, the narrow band of the energy spectrum E1-E4 is different from the narrow bands of the energy spectra associated with the other excitation signals (i.e. E1≠E2≠E3≠E4), this energy spectrum in its own narrow band E1-E4 having a center frequency separate from the center frequencies of the other spectra.

As illustrated in FIG. 7, the energy spectrum E1-E4 of each electrical excitation signal S1-S4 is contained in the available bandwidth $B_{Global}$ of the transducer. Moreover, the adjacent energy spectra E1/E2, E2/E3, E3/E4 of two separate excitation signals S1/S2, S2/S3, S3/S4 may partly overlap. In all cases, the center frequencies of the energy spectra associated with the different excitation signals are different.

In an embodiment, the ultrasound waves in narrow bands may be transmitted in one and the same direction toward a target object. In this case with each shot, all the transducers of the probe successively transmit the ultrasound waves in narrow bands along a given direction and angle. The operation is repeated along different angles (5 to 10).

In a variant, the narrowband ultrasound waves may be transmitted along different directions. In this case with each shot, the transducers transmit only one ultrasound wave in its respective narrow band per given direction (angle or position). For example, if the transducers are supposed to transmit eight ultrasound waves in separate narrow bands, eight shots along separate directions are taken, one ultrasound wave in its respective narrow band being transmitted by the transducers for each shot.

When the ultrasound waves in narrow bands are transmitted along different directions, each ultrasound wave can be adjoined to a respective direction according to a carefully-chosen function of the central frequency of its associated excitation signal. In particular, each ultrasound wave obtained from an excitation signal, the central frequency of which belongs to the high frequency domain (i.e. $f_c \geq 3$ MHz) can be adjoined to a direction having an angle between 0 and 15° relative to a normal to the set of transducers 41 (the ultrasound waves associated with the excitation signals of lower center frequencies being adjoined at directions forming an angle greater than 15° with respect to the normal to the set of transducers 41). This makes it possible to limit the loss of information related to the formation of array lobes in the high frequencies.

The use of ultrasound waves obtained from excitation signals at frequency spectra in narrow bands makes it possible to improve the Signal-to-Noise Ratio of the echographic images obtained as described in the prior art: If the received signals of each narrow band are filtered according to the mask of the band used before being summed, then the signal-to-noise of the sum is greater than that obtained in wideband with the same excitation of a factor equal to the number of sub-bands k. This stems from the fact that the sum signal will be approximately k times more intense than the wideband signal, whereas the aggregated noise of the filtered sub-bands will not be higher than the noise of a wideband signal.

2.2. Step of Reception of Acoustic Echoes and Conversion into Electrical Signals As previously indicated, the frequency band of the energy spectrum $B_{Global}$ of the transducer is subdivided into a plurality of narrow sub-bands, and excitation signals of the transducers having energy spectra corresponding to each of these sub-bands are successively applied to the set of transducers 41 by the transmitter stage 421 of the acquiring unit 42.

For each transducer of the set, the successive application of the excitation signals incurs the successive transmission of a plurality of ultrasound waves by said transducer, each ultrasound wave transmitted being associated with an energy spectrum excitation signal in its respective narrow band.

Each incident ultrasound wave transmitted—for example a plane or divergent or spherical (etc.) wave, or even a focused wave in a worst-case scenario—propagates through the medium to be imaged, then raw signals detected by the transducers of the set 41 are recorded by the receiver stage 422.

Each raw signal corresponds to the conversion, by the transducers of the set 41, of a reflected ultrasound wave—i.e. acoustic echo—reverberated by the diffusers of the medium from the incident wave.

Since such a step of reception of an acoustic echo and conversion of it into an electrical signal (hereinafter referred to as an "echo signal") is known to those skilled in the art, it will not be further detailed here. The reader will however appreciate that the echo signals thus obtained (and representative of the acoustic echoes detected by the transducers of the set 41) are analog signals.

2.3. Preprocessing of the Echo Signals 2.3.1. Digitization

The step of digitization 100 transforms the analog echo signals coming from each transducer into digital signals.

The digitization step is implemented by Analog-to-Digital Converters integrated into the reception stage of the probe. The number of Analog-to-Digital Converters is chosen to process all the signals coming from each of the elements of the probe, for example ideally equal to the number of transducers of the set of transducers.

Each Analog-to-Digital Converter samples each analog echo signal of its associated transducer, at a predetermined sampling frequency $F_S$, and converts the analog echo signals into digital signals.

The sampling frequency $F_S$ is preferably the same for all the shots, although this is not obligatory, and chosen to be greater than twice the maximum frequency present in the analog echo signal under consideration. This makes it possible to avoid any interference (i.e. mixing) between the replicated spectra of the analog electrical reception signal under consideration (Nyquist-Shannon criterion). A sampling frequency $F_S$ may be chosen that is typically in the vicinity of four times the central frequency of the probe $F_C$. The advantage of a single sampling frequency is the simplification of the analog anti-aliasing filter, which is also single.

Figure 8:
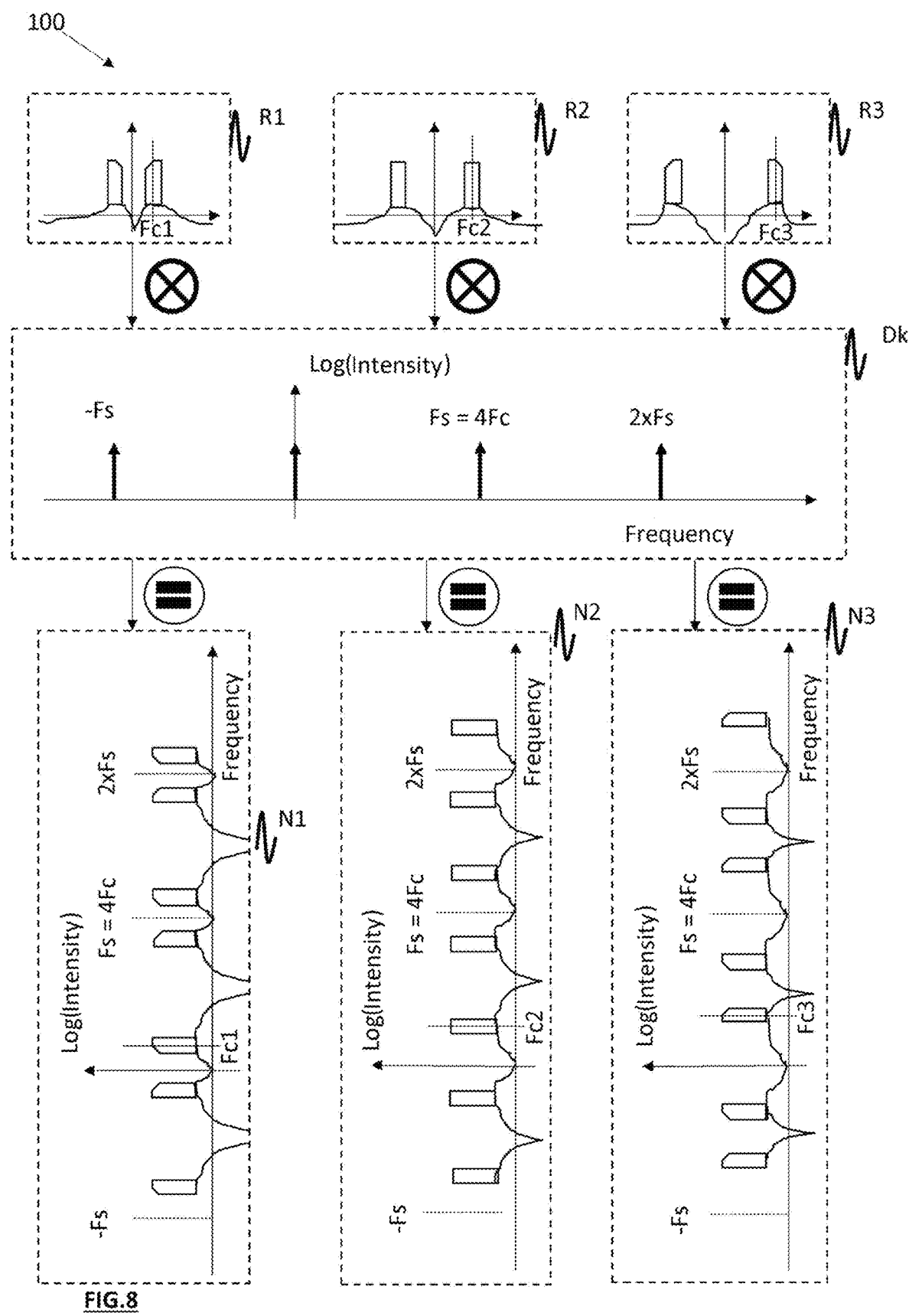
FIG. 8 is a schematic representation of a digitization step.

FIG. 8 schematically illustrates the digitization step in the case of a transducer:

having successively transmitted three ultrasound waves in response to the successive application of three excitation signals S1, S2, S3 of respective central frequencies $F_{C1}$, $F_{C2}$, $F_{C3}$ which are separate and contained in the excitation frequency range of the transducer, and having obtained three analog echo signals representative of three acoustic echoes successively received by the transducer in response.

Each analog echo signal is multiplied by a Dirac comb of period $1/F_S$, where $F_S$ is the sampling frequency, and for which the frequency spectrum $D_K$ (which is simply another Dirac comb at the multiple frequencies of $F_S$) is illustrated in FIG. 8. More precisely, the frequency spectrum R1, R2, R3 of each echo signal is convoluted by the frequency spectrum $D_K$ in the Fourier space.

This gives a digital signal of spectrum N1, N2, N3 for each analog echo signal corresponding to a transducer, the spectrum N1, N2, N3 of each digital signal corresponding to the replication of the frequency spectrum R1, R2, R3 of each echo signal around each line of the frequency spectrum $D_K$.

The reader will appreciate from FIG. 8 that to avoid mixing the replicated spectra, it is necessary (Nyquist) for the sampling frequency to be greater than twice the maximum frequency of the electrical reception signal under consideration ($F_S > 2 \times 1.5 F_C$ where Fc is the center frequency of the probe, and where the total passband of the probe is not greater than its center frequency (bandwidth less than 100%))).

The term "center frequency of the probe" should be understood to mean the center frequency of the operating frequency band of the transducers (since the transducers do not generate any ultrasound waves when an electrical signal of a frequency not contained in this band is applied to them.) In the example illustrated in FIG. 8, the sampling frequency is chosen constant for each echo signal to be digitized. More precisely, this sampling frequency chosen equal to four times the center frequency of the working frequency band of the transducer (i.e. the frequencies for which the transducer is able to transmit or receive an ultrasound wave):

$$F_S = 4 \times Fc,$$

Where Fc is the center frequency of the working frequency band of the transducer (range of excitation frequencies of the transducer).

The reader will appreciate that if several of the spectra R1, R2 and R3 are unconnected, then the emissions generating the corresponding signals can be transmitted immediately after one another, or even simultaneously, the resulting echoes temporally overlapping and therefore able to be sampled and digitized into a single operation. This then results in a digitized "single recording" including information representative of each of the echo signals, the following operations of demodulation specific to each sub-band being able to be conducted on this digitized "single recording" (equivalent to a single digitized signal).

Thus, it will be understood that the use, in the claims, of the expression "digitization of the first and second electrical reception signals to obtain first and second digital signals" covers both:

the case of the digitization of separate electrical signals each associated with a respective echo signal, and the case of the digitization of a single electrical signal including information representative of each of the echo signals.

In a variant, the sampling frequency could be adapted to each sampled band, on condition that the analog anti-aliasing filter can also be adapted to avoid spectrum aliasing.

The digitization step thus makes it possible to obtain, for each transducer, a maximum number "k" of digital signals, where "k" represents the number of excitation signals in narrow bands applied to the transducer.

Assuming that the set of transducers 41 of the probe is composed of a number "X" of transducers (128, 256, etc.), and that the digitization is implemented on "n" bits, then the total flow rate $D_{tot}$ of digitized data is:

$$D_{tot} = X \times 4 \times F_C \times n$$

For 128 transducers working at a central frequency of 10 MHz and a digitization on 14 bits this gives nearly 72 Gb/sec, i.e. a very high data flow rate.

The ensuing demodulation operation makes it possible to reduce this data flow rate, taking advantage of the fact that the system has a limited passband.

More precisely, the demodulation makes it possible to extract the information contained in each digital signal obtained after the digitization step. In particular, the demodulation makes it possible to center the spectrum N1, N2, N3 of each digital signal around the zero frequency.

This so-called "I-Q" demodulation is performed by two frequency mixing operations in phase (I) and in quadrature (Q) between each digital signal resulting from the digitization step, and a local oscillator at the demodulation frequency $F_d$.

Figure 16:
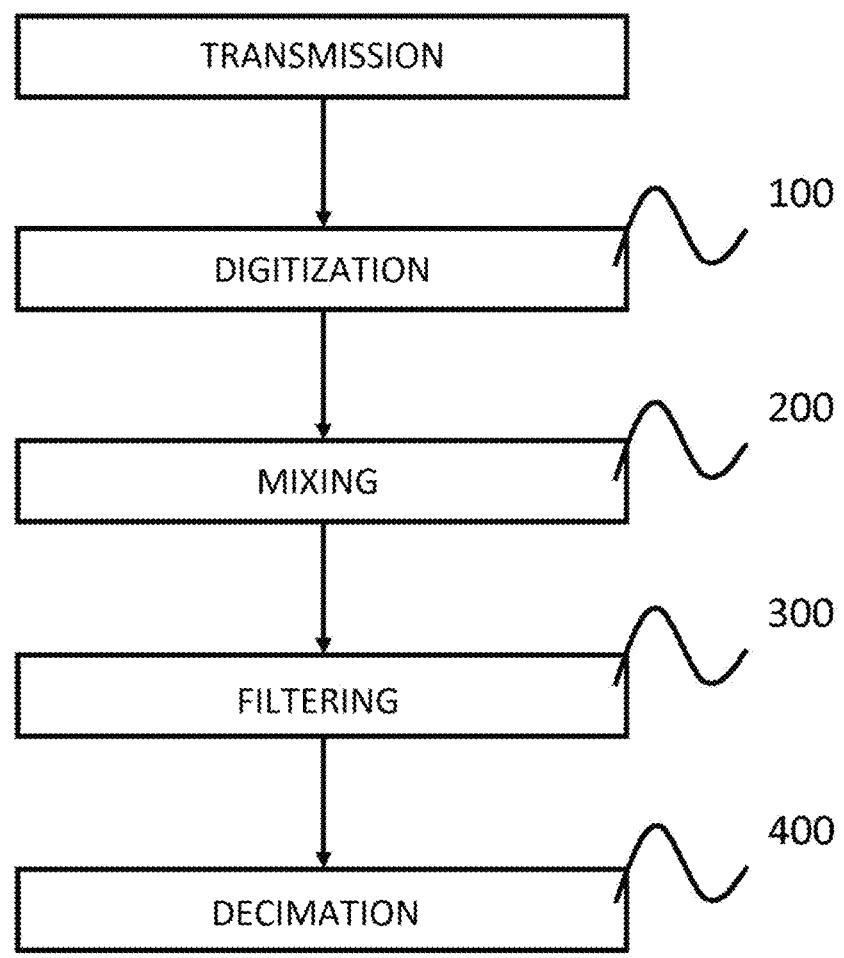
FIG. 16 is a schematic representation of steps of preprocessing of acquired echo signals.

As illustrated in FIG. 16, the demodulation operation comprises a mixing step 200 and a filtering step 300.

2.3.2. Mixing

Figure 9:
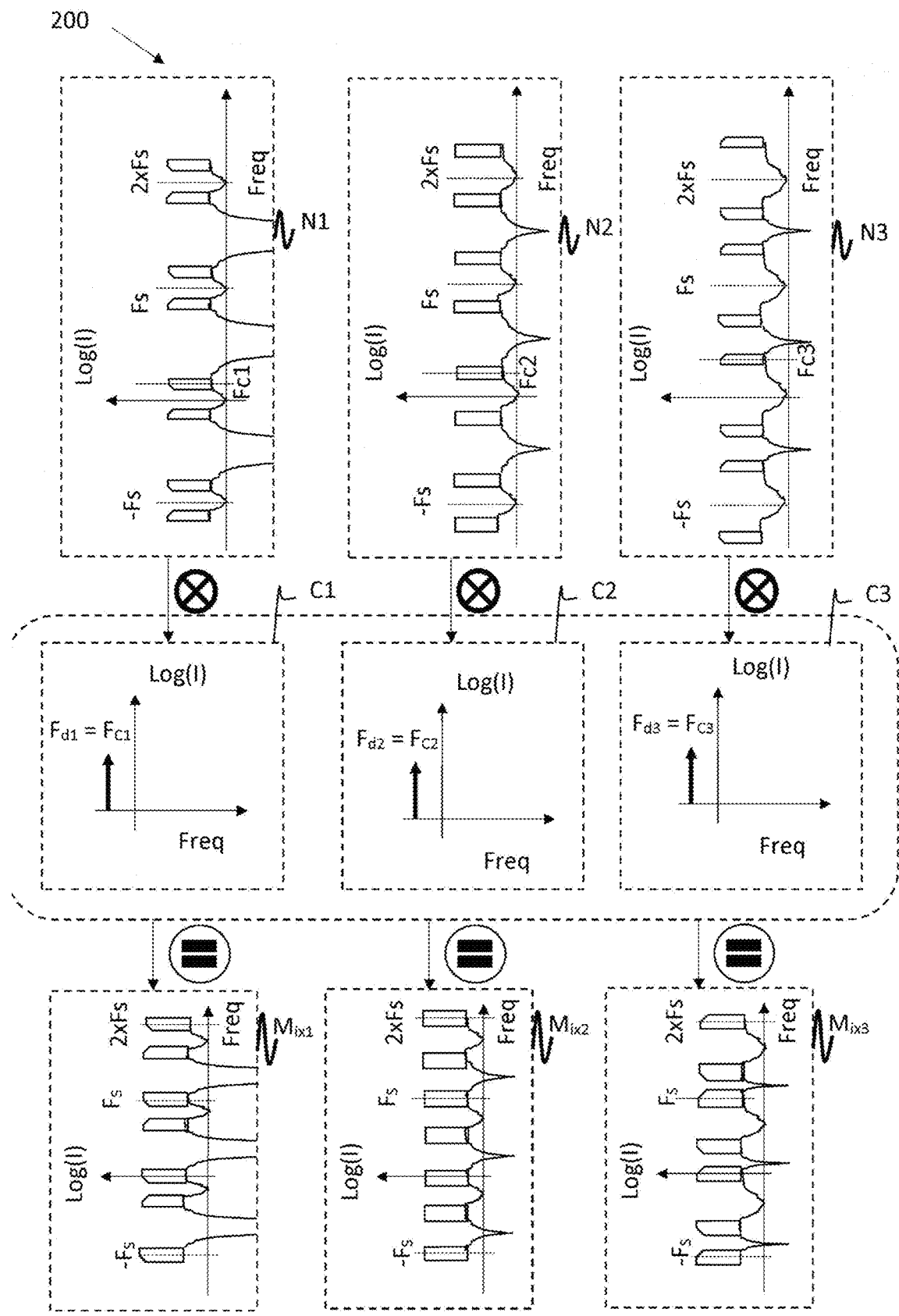
FIG. 9 is a schematic representation of a mixing step.

FIG. 9 illustrates the step of mixing the digital signals of spectra N1, N2, N3 obtained after the digitization step in the case of the transducer that has successively transmitted three ultrasound waves in response to the successive application of three excitation signals S1, S2, S3 of center frequencies $F_{C1}$, $F_{C2}$, $F_{C3}$.

Advantageously, the mixing frequency $F_d$ used to mix each digital signal is chosen equal to the center frequency $F_{C1}$, $F_{C2}$, $F_{C3}$ of the excitation signal that made it possible to obtain the acoustic echo corresponding to the digital signal under consideration. In other terms, each digital signal is mixed with the center frequency of its associated excitation signal.

Thus, and as illustrated in FIG. 9 for the so-called mixing step:

for the digital signal of spectrum N1 corresponding to the digitization of the electrical reception signal associated with the spectrum R1, the mixing frequency $F_{d1}$ is chosen equal to $F_{C1}$, where $F_{C1}$ is the center frequency of the electrical excitation signal S1, for the digital signal of spectrum N2 corresponding to the digitization of the electrical reception signal associated with the spectrum R2, the mixing frequency $F_{d2}$ is chosen equal to $F_{C2}$ (central frequency of the electrical excitation signal S2), with $F_{C2}$ greater than $F_{C1}$, for the digital signal of spectrum N3 corresponding to the digitization of the electrical reception signal associated with the spectrum R3, the mixing frequency $F_{d3}$ is chosen equal to $F_{C3}$ (center frequency of the electrical excitation signal S3), with $F_{C3} > F_{C2} > F_{C1}$.

More precisely the mixing step 200 of the demodulation consists, for each digital signal under consideration, in multiplying said digital signal by a complex signal of the following form:

$$\cos(2\pi * F_d * t) - i * \sin(2\pi * F_d * t),$$

Where $F_d$ corresponds to the mixing frequency, said mixing frequency being chosen equal to the center frequency $F_{C1}$ ($F_{C2}$, $F_{C3}$ respectively) of the electrical excitation signal S1 (S2, S3 respectively) associated with the digital signal under consideration N1 (N2, N3 respectively).

In the frequency domain and as illustrated in FIG. 9, the mixing consists in convoluting the spectrum N1 (N2, N3 respectively) of the digital signal by the spectrum C1 (C2, C3 respectively) of the complex missing signal with frequency $F_{d1} = F_{C1}$ ($F_{d2} = F_{C2}$, $F_{d3} = F_{C3}$ respectively). This gives a mixed signal, for which a spectrum $Mix_1$ ($Mix_2$, $Mix_3$ respectively) is illustrated in FIG. 9.

The fact that the mixing of each digital signal is implemented at a different mixing frequency—and in particular at a mixing frequency equal to the center frequency of the frequency band of the excitation signal associated with the digital signal—will make it possible to maximize the subsequent decimation in order to optimally reduce the number of data to be transmitted from the probe 4 to the external computing unit 5.

The reader will appreciate that the method may comprise several mixing steps for each digital signal at several different frequencies, for example:

a first step of mixing of each signal with the central frequency ($F_{C1}$, $F_{C2}$, $F_{C3}$, etc.) of the excitation signal, and a second step of mixing with a multiple of this center frequency of the excitation signal (for example half and/or twice and/or thrice the center frequency of the excitation signal), etc.

This makes it possible to take into account the information contained in the fundamental and harmonic bands in the digital signal under consideration for the subsequent processing steps (for example formation of images or extraction of data representative of the region of interest).

2.3.3. Filtering

The filtering step 300 makes it possible, after mixing, to eliminate the signals present at a frequency equal to the sum of the signal frequency and the mixing frequency, i.e. in our case the signals present at around twice the mixing frequency.

More precisely, the filtering step consists in applying a low-pass filter to each mixed signal to eliminate these double-frequency components.

Figure 10:
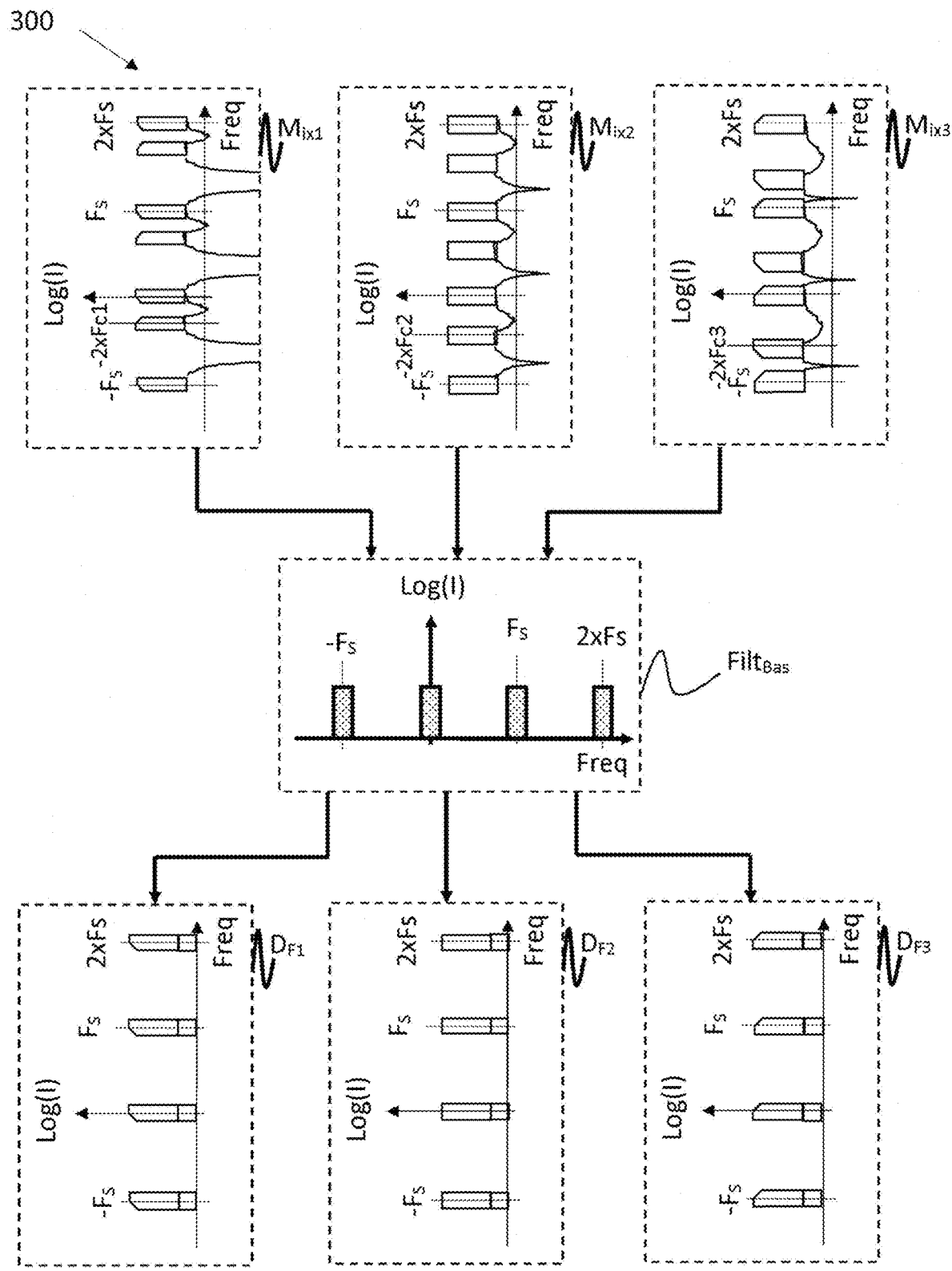
FIG. 10 is a schematic representation of a filtering step.

FIG. 10 illustrates the step of filtering the mixed signals of spectra $Mix_1$, $Mix_2$, $Mix_3$. The filtering step consists in the multiplication of each spectrum $Mix_1$, $Mix_2$, $Mix_3$ by the spectrum $Filt_{Bas}$ of the low-pass filter of width equal to the frequency band of the excitation signal S1, S2, S3 associated with the mixed signal under consideration. This gives filtered signals of spectra $D_{F1}$, $D_{F2}$, $D_{F3}$, each filtered signal being associated with a respective electrical excitation signal S1, S2, S3.

The filtering step makes it possible to keep only the portions of the spectrum located at a multiple of the sampling frequency. The spectrum of the signal is therefore "cleaned" between the successive occurrences of the spectrum at the various multiples of the sampling frequency.

This makes it possible to purify the signal spectrum with a view to the subsequent decimation step. More precisely, low-pass filtering is used to suppress the components of the signals at the double of the mixing frequencies. This avoids the risk of signal overlap during the subsequent decimation step.

The application of the mixing and filtering steps (mixing+filtering=demodulation) to each of the digital signals makes it possible to obtain demodulated signals.

2.3.4. Decimation

The decimation step 400 consists in periodically removing a number "a" of samples to reduce the quantity of data to be transmitted from the probe to a remote processing device. For example, the decimation factor may be of four: the decimation step then consists in the removal of three samples out of four of the demodulated signal for each sub-band. The term "sample" refers to a demodulated IQ pair.

Figure 11:
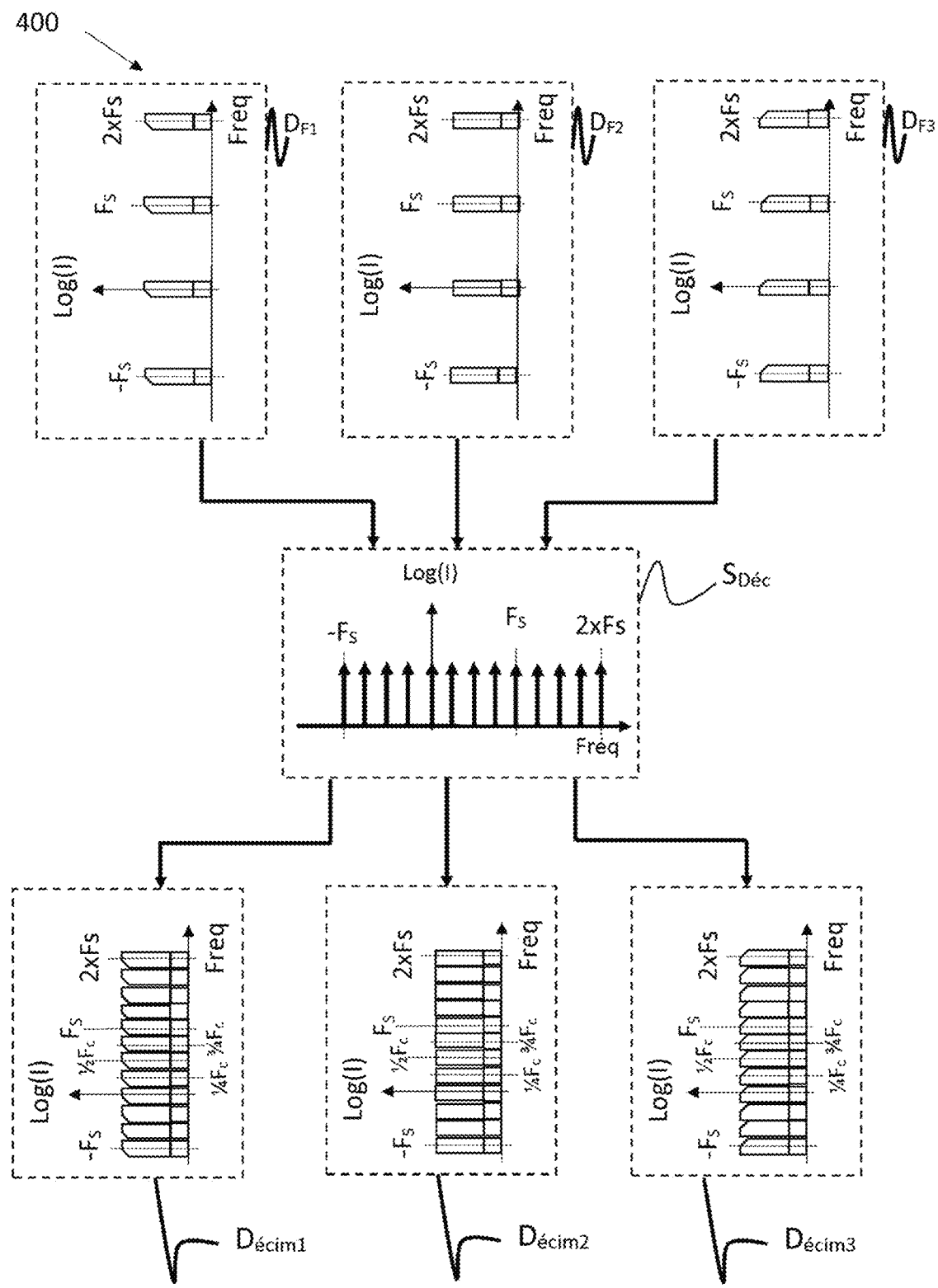
FIG. 11 is a schematic representation of a decimation step.

FIG. 11 illustrates an example of a decimation step. Each filtered signal is multiplied by a Dirac comb of period $4/F_S$, where $F_S$ is the sampling frequency, and for which the frequency spectrum Spec (which is simply a Dirac comb with frequencies that are multiples of $F_S/4$) is illustrated in FIG. 11. More precisely, the frequency spectrum $D_{F1}$, $D_{F2}$, $D_{F3}$ of each filtered signal is convoluted by the frequency spectrum Spec in the Fourier space.

This gives a decimated signal of spectrum $D_{écim1}$, $D_{écim2}$, $D_{écim3}$ for each demodulated signal, the spectrum $D_{écim1}$, $D_{écim2}$, $D_{écim3}$ of each demodulated signal corresponding to the replication of the frequency spectrum $D_{F1}$, $D_{F2}$, $D_{F3}$ of each demodulated signal around each line of the frequency spectrum $S_{Déc}$.

Thus, the demodulation-decimation operation makes it possible to reduce the number of data to be transmitted between the probe and the remote processing device.

The data preprocessed by the probe can then be transmitted to the remote processing device for the application of different processing algorithms. The reader will appreciate that the preprocessed data are not echographic images, since the production of an echographic image requires the processing of raw signals, for example by beamforming.

Of course, other techniques known to those skilled in the art may be used:
- to reconstruct the echographic image(s) or
- to compute directly from raw data the information representative of the region of interest (elastography using a neural network solution etc.) without reconstruction of intermediate images.

3. Theory Relative to the Invention

Various theoretical elements relating to the invention will now be introduced, to allow those skilled in the art to better understand the advantages associated with the solution described above.

3.1. Improvement of the Signal-to-Noise Ratio 3.1.1. Frequency Band of Each Excitation Signal As previously indicated, one of the features of this invention consists in replacing a very short excitation of very high amplitude, approaching an ideal Dirac, by the coherent sum of several excitation trains S1, S2, S3, S4 produced at different chosen frequencies equally distributed over the working frequency band of the transducer, and all having the same phase, for example a zero phase (a maximum) at half their duration (see FIG. 6). The coherent summation of several excitation signals of frequency spectra in narrow bands makes it possible, when the characteristics of the signals are suitably chosen (identical phases, appropriate overlap of the bands), to obtain a resultant signal with a frequency spectrum in a wide band, this signal having an improved Signal-to-Noise Ratio by comparison with a wideband frequency spectrum excitation signal. The narrow bands of the frequency spectra of the different excitation signals—hereinafter referred to as "sub-bands"—are adjacent to one another, with a few overlaps, and their width and the shape of the aggregated bands are equivalent to the width and shape of the working frequency bands of the transducer.

In other words, the spectrum of a wideband excitation signal is "cut up" into "N" sub-bands, and "N" excitation signals for which the spectra corresponding to these "N" sub-bands are computed. This makes it possible to improve the Signal-to-Noise Ratio by a factor in the vicinity of "N".

However, if this feature of the invention makes it possible to improve the Signal-to-Noise Ratio by a factor "N", it also entails the multiplication by a factor "N" of the quantity of data to be transmitted between the probe and the remote processing device ("N" shots being needed for the formation of an echographic image from "N" sub-bands).

To limit the quantity of data to be transmitted, the solution described above thus comprises other features, and in particular:
- the digitization of the signals received at each transducer,
- the mixing of each digitized signal with the center frequency of the sub-band associated with the digitized signal under consideration,
- the low-pass filtering of each signal mixed by a low-pass filter, the attenuation of which, at a frequency half the frequency width of the sub-band associated with the mixed signal under consideration, is between 2 dB and 10 dB,
- the decimation of each filtered signal by a factor "G" increasing with the number of sub-bands "N",
- the use of different frequencies by angles in the context of synthetic imaging to improve the spatial resolution as well as the contrast.

3.1.2. Shape of the Excitation Signals

The four narrowband signals of FIG. 6, the addition of which gives a wideband signal of shortened duration, are the convolution of:
- a transmission excitation,
- the impulse response of the probe, and
- the response of the narrowband reception filter which is in fact the demodulation low pass, since only systems in which the received data are demodulated are being considered in this text.

The end results of these convolutions are resultant digital signals, for which the spectra $E_1$, $E_2$, $E_3$, $E_4$ (see FIG. 7) are connected to one another in such a way as to synthetize as well as possible an overall band $B_{Global}$ with an impulse response of minimal duration.

Thus, for example, if there is no phase distortion in each sub-band, the spectra $E_1$-$E_2$, $E_2$-$E_3$, $E_3$-$E_4$ of two adjacent bands may intersect at −6 dB in the overall band $B_{Global}$ that one wishes to synthesize. Of course, other types of connection with a non-constant phase may be used (as proposed in the field of multichannel high-fidelity loudspeakers).

Since the technical features of the probe (transducer etc.) are fixed, it is possible to vary the shape of each excitation signal as well as the mask of the low-pass filter used during the demodulation operation, with the aim of reducing the quantity of data to be transmitted between the probe and the remote processing device. In particular, the digitization of the data acquired by the transducers makes it possible to adjust the mask of the demodulation filter to a much higher degree of accuracy than in the case of an analog solution.

Figure 12:
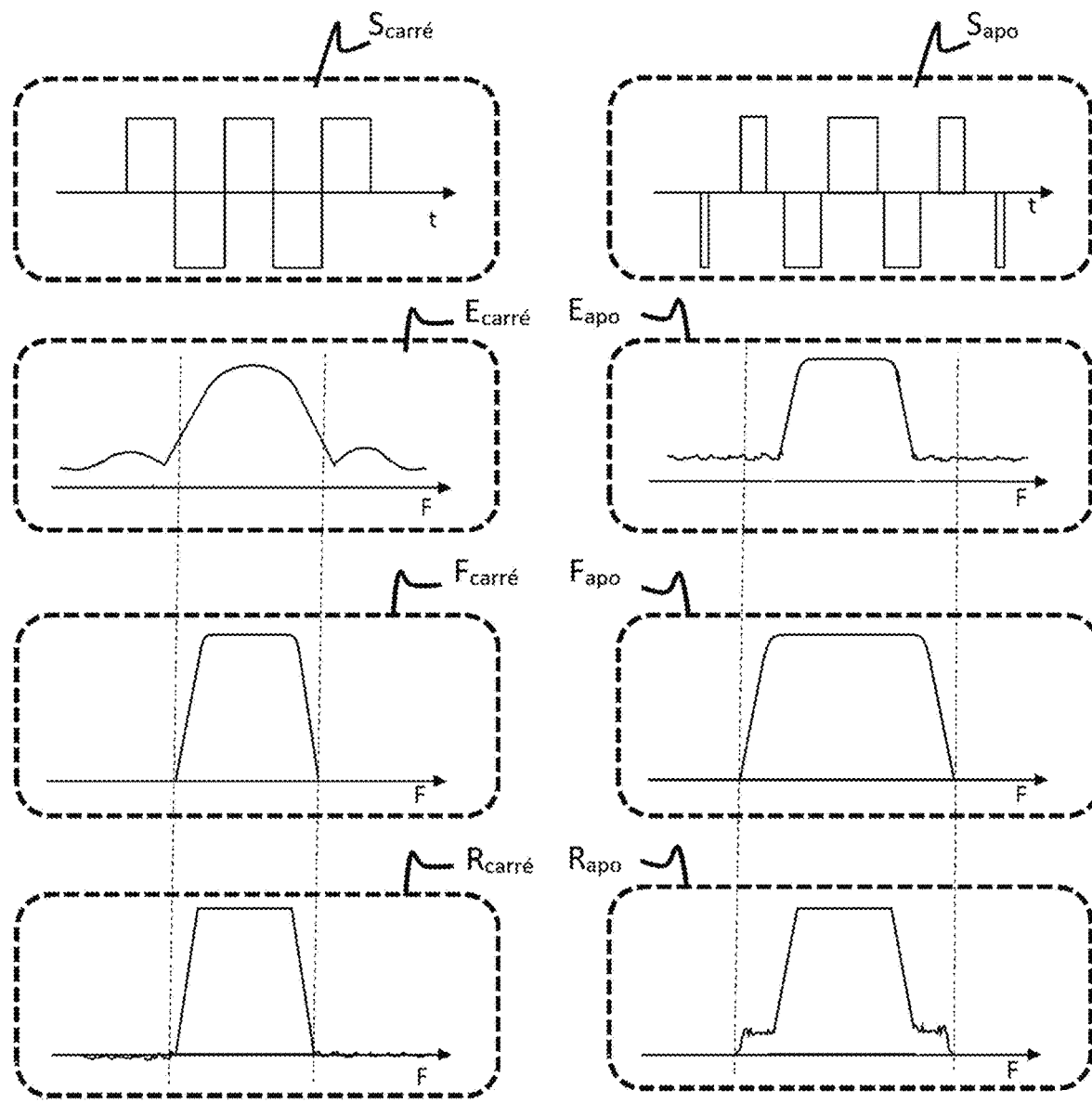
FIG. 12 is a schematic representation of processing applied to different types of excitation signal.

Thus, different forms of excitation signal may be used. By way of example, FIG. 12 illustrates two examples of excitation signals $S_{carré}$, $S_{apo}$ which make it possible to arrive at the same final narrowband signal after preprocessing.

In a first variant embodiment, the excitation signal $S_{carré}$ for the generation of an ultrasound wave by each transducer can be of square shape (i.e. composed of a plurality of fixed-voltage cycles). The echo signal received by each transducer (which is representative of a portion of the ultrasound wave backscattered toward the transducer) then has a frequency spectrum $E_{carré}$ of shape sin(x)/x which eventually exceeds the desired frequency sub-band. In subsequent mixing/filtering/decimation steps, it is thus preferable to use a low-pass filter $F_{carré}$ of a width substantially in the vicinity of the width of the desired sub-band of frequencies. After the decimation step (not shown), a final narrowband signal of the desired spectrum $R_{carré}$ is obtained. This first solution (i.e. square-shaped excitation signal) has the advantage of being easy to implement, and makes it possible to efficiently delete the noise B outside the sub-band under consideration.

In a second variant embodiment, the excitation signal $S_{apo}$ may be of apodized shape (i.e. composed of a plurality of fixed-voltage crenellations of variable width and having axial symmetry over a given time period). Such an excitation signal of apodized shape $S_{apo}$ can be obtained using a pulse generator of "PWM (Pulse Width Modulation)" type. The echo signal received by each transducer then has a frequency spectrum $E_{apo}$ of a width in the vicinity of that eventually desired for the sub-band in question. During subsequent mixing/filtering/decimation steps, a low-pass filter ($F_{apo}$)—of a width, in this case, greater than the frequency width of the sub-band in question—is applied. After the decimation step (not shown), a final narrowband signal of spectrum $R_{apo}$ is obtained. This second solution (i.e. excitation signal of apodized shape), although more complex to implement, has the advantage of being more energy-efficient than the first variant (this is because, in the first variant, portions of the echo signal extend outside the sub-band of the excitation signal: this means that the part of the energy transmitted which enabled the acquiring of these portions of the echo signal are transmitted as pure losses since they are filtered by the low-pass filter during the filtering step).

3.2. Mixing/Filtering/Decimation

As previously indicated, the echo signals generated by the transducers in response to the reception of the acoustic echoes are digitized prior to the implementation of the mixing, filtering and decimation step. This digitization step will not be described in further detail in the remainder of the text.

The reader will however note that the digitization of the analog echo signals coming from the transducers makes it possible:
- firstly, to simplify the implementation of the subsequent mixing, filtering and decimation steps, and
- secondly, to maximize the effectiveness of the subsequent mixing, filtering and decimation steps in order to reduce as much as possible the quantity of data to be transferred between the probe and the remote processing device.

Since the signals to be processed in the mixing/filtering/decimation steps are digitized, it is possible to demodulate (i.e. mix+filter) each sub-band in order to be able to profit from the limited bandwidth of the system and continue to the decimation as previously explained. In such a way that the decimation factor can be at a maximum, a different demodulation frequency is chosen for each sub-band. More precisely for each sub-band, the mixing frequency chosen to mix the digitized echo signal is equal to the center frequency of the sub-band (or a multiple of the center frequency of the sub-band).

Figure 13:
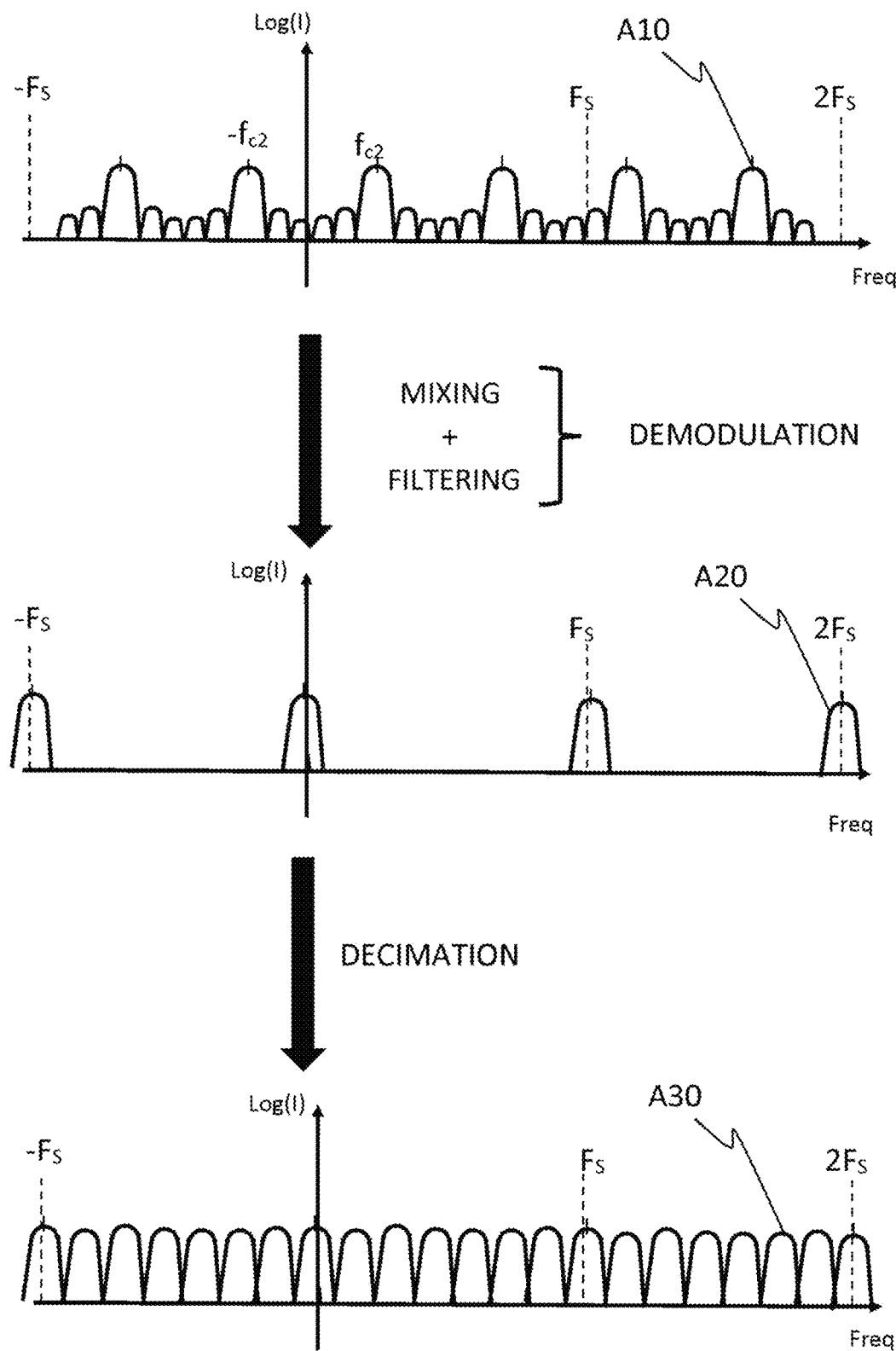
FIG. 13 is a schematic representation of mixing, filtering and decimation steps.

FIG. 13 illustrates the steps of mixing/filtering/decimation of the spectrum A10 of a digitized echo signal, for which the center frequency of the sub-band is $f_{c2}$. The echo signal is mixed with the center frequency $f_{c2}$ of the sub-band of its associated excitation signal, and filtered using a low-pass filter with a cut-off frequency equal to half the width of the sub-band. This gives a mixed and filtered signal, the spectrum A20 of which is shown in FIG. 13. This mixed and filtered signal is then decimated. The decimated signal thus obtained, of spectrum A30, can then be transmitted to the remote processing device by the probe.

If the working band of the transducer is subdivided into a number "N" of sub-bands, then the mixed/filtered/decimated signals will have to be transmitted for the "N" sub-bands: therefore "N" times more mixed/filtered/decimated signals must be transmitted between the probe and the remote processing device by comparison with a wideband signal.

However, for each sub-band, the decimation factor can be "N" times larger than in the case of a decimation of a wideband signal (corresponding to the working band of the transducer), since each sub-band is "N" times narrower than the total wide band.

One must therefore transmit "N" times more mixed/filtered/decimated signals in the sub-band, but each mixed/filtered/decimated signal in the sub-band contains a quantity of data "N" times smaller than a mixed/filtered/decimated wideband signal.

Thus, the technique described above allows a gain in the Signal-to-Noise Ratio of a factor "N" without requiring the transmission of a greater quantity of data than in the case of an echo signal obtained from a single wideband excitation signal (i.e. for which the wide band is equivalent to the working frequency band of the transducer).

As previously indicated, the sampling frequency may be chosen equal to "K" times (typically K=4) the central frequency of the working frequency band of each transducer: $F_S=K*F_C$ (with for a bandwidth of 100%). The decimation factor may therefore be chosen equal to "K*N", where "K" is equal to the ratio of the sampling frequency used in the digitization step to the center frequency of the working frequency band of each transducer. In practice, a decimation factor will be chosen equal to the integer part of "½*K*N". This makes it possible to better preserve:

the shapes of the resultant signals for each sub-band, and the quality of the final rendering.

3.3. Reconstruction of Elementary Images by Beamforming

The data transferred by the probe can then be processed by the remote processing device.

The remote processing device implements different steps.

One of these steps may consist in the reconstruction of elementary images by the so-called beamforming technique which will now be described in the context of this invention.

To better understand the advantages associated with this invention, the technique of beamforming based on a plurality of narrowband signals will be described and compared to the case of beamforming based on a wideband signal.

In the case of a demodulated wideband signal of center frequency $F_C$ limited by the Nyquist criterion, the beamforming step requires the computation of one complex point per cycle of received signal. The axial pitch between two points computed as adjacent is therefore equal to ½λc (because of outward and return journey of the ultrasound wave, two points ½λc distant will be seen on the RF signals as one cycle apart).

In the case of "N" narrowband signals (division of the wide band into "N" sub-bands), the step of beamforming of each sub-band signals require the computation of "N/2" times fewer points than in the wide band. In fact, in the case of "N" sub-band signals, as the Nyquist criterion is met with "N/2" fewer grid points, the computation grid will have an axial pitch that will be "N/2" times greater than in the wide band.

Figure 14:
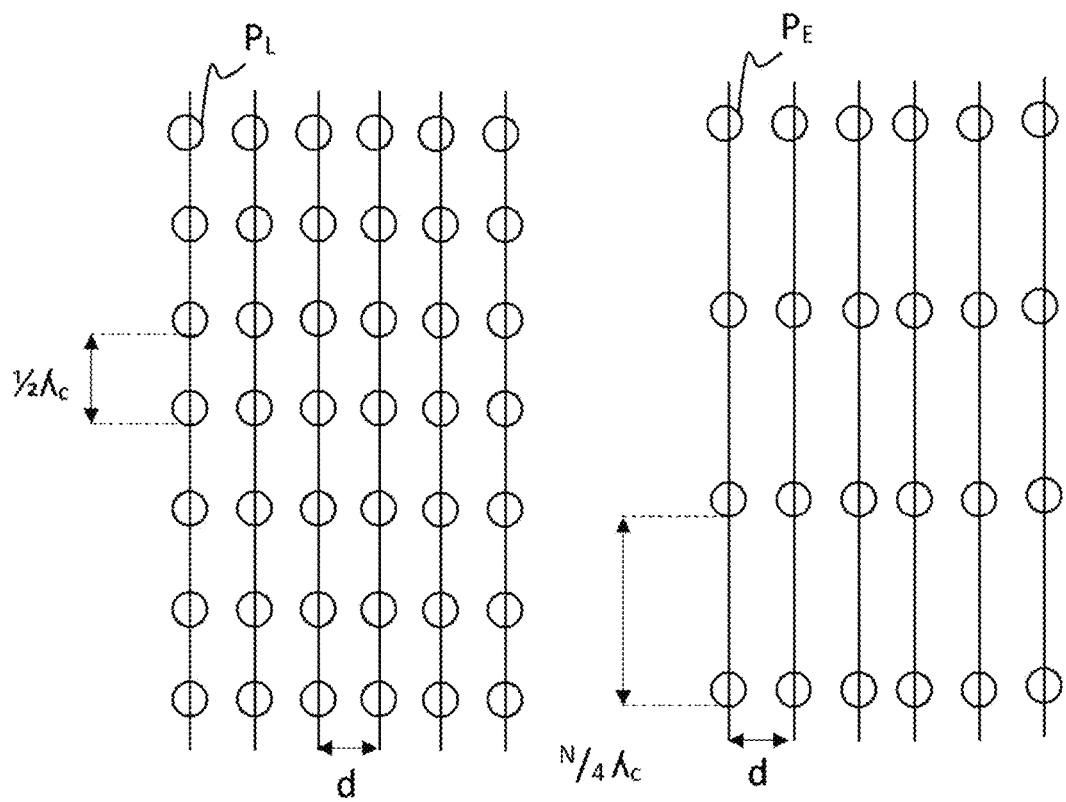
FIG. 14 is a schematic representation of elementary images corresponding to beams formed by beamforming.

Thus, and as illustrated in FIG. 14 (for N=4), the axial density of points $P_E$ to be computed for "N" sub-bands is "N/2" smaller than the axial density of points $P_L$ to be computed for one wide band. The lateral density (equivalent to the separation d between two adjacent transducers of the probe) is the same for one wideband signal as for one sub-band signal.

Thus the beamforming of the "N" sub-band signals requires only twice as many computations as for the beamforming of one wideband signal. This is true whatever the number of sub-bands.

Moreover, an additional advantage of the subdivision of the wide band of an excitation signal into "N" sub-bands is that it allows the optimal adaptation of the reconstruction aperture used during the beamforming step.

In fact, to reconstruct a point during the beamforming step, the portion of the echo signal of each transducer contributing to this point is sought. However, for a given point to be reconstructed, the echo signals of certain transducers of the set of transducers of the probe do not contain any information representative of this point. This is particularly the case in the high frequencies, for the echo signals of transducers for which the angle between:

a normal passing through the center of the transducer and a straight line passing through the center of the transducer and through the point to be reconstructed, is greater than a value which decreases when the frequency increases (the transducers being directional, they do not receive any signal beyond a certain angle, and the greater the frequency, the smaller this angle).

Thus, in the context of this invention, it is possible to vary the reconstruction aperture (i.e. the number of transducers whose echo signals must be taken into account when reconstructing a point under consideration) as a function of the frequency of the sub-band under consideration. The lower the frequency of the sub-band, the greater the reconstruction aperture (to maximize the quantity of information taken into account when reconstructing the point under consideration), and the greater the frequency of the sub-band, the smaller the reconstruction aperture (to avoid including information-less noise in the reconstruction of the point under consideration).

3.4. Combination

Another step for obtaining a final echographic image relates to the combination of the echographic images formed during the beamforming step.

Thus, each partial elementary image being obtained for one respective sub-band, it is necessary to place them in a same spatial and frequential frame of reference to allow them to be summed in order to arrive at a final echographic image.

Figure 15:
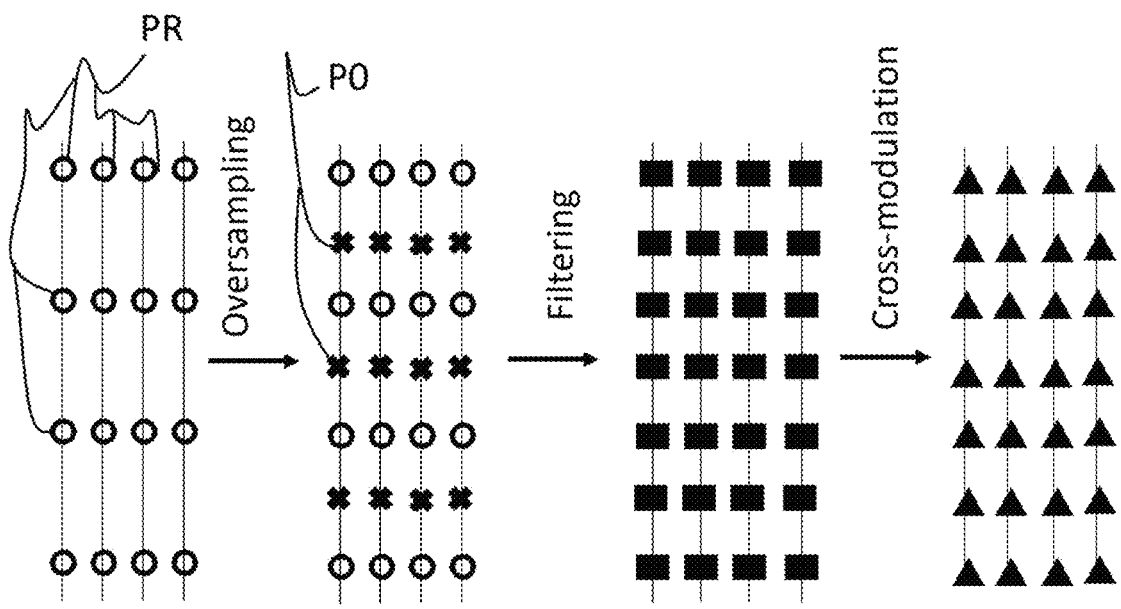
FIG. 15 is a schematic representation of a cross-modulation step applied to an elementary image.

This placement in one and the same frame of reference requires the implementation of a conversion step, the conversion step including the following sub-steps for each elementary image formed:

oversampling of the points of the elementary image under consideration (with reference to FIG. 15, inclusion of (N/2−1) points $P_0$ of zero value between two points PR reconstructed by beamforming) to obtain an oversampled elementary image, in-depth low-pass filtering of the points of each oversampled elementary image to interpolate the values of the points of the oversampled elementary image, the filtering making it possible to obtain a filtered elementary image, cross-modulation by linear rotation of the phase of the points of each filtered elementary image to cross-modulate it around the central frequency $F_C$ of the transducer.

Once the cross-modulation step has been carried out, the converted elementary images may be summed to obtain the final echographic image.

4. Conclusions

The system and method previously described make it possible to:

improve the Signal-to-Noise Ratio of the images obtained from an echograph including:
  a probe for acquiring data, and
  a remote processing device for processing the acquired data,
while limiting the quantity of data to be transferred from the probe toward the remote processing device.

More precisely, the fact of synthetically constructing a wideband signal (working band of each transducer of the probe) from "N" narrowband echo signals makes it possible to obtain an echographic image having a Signal-to-Noise Ratio "N" times greater than that of an echographic image obtained from a wideband echo signal.

Moreover, the fact that:

the signals recorded by the transducers are:
  demodulated at the average frequency of each narrow band, the demodulation carried out by mixing with sinusoidal signals in quadrature (sine and cosine), and low-pass filtering on each I and Q component, then
decimated until only (alpha*B) demodulated IQ pairs per second remain, where B is the width of the narrow band in 1/sec, and alpha is a dimensionless real number between 1 and 3, ideally chosen at around 2 (if alpha=1 one is working at the Nyquist limit: it is preferable to leave a small amount of margin where this limit is concerned)

makes it possible to reduce the quantity of data to be transmitted from the probe toward the remote processing device.

The reader will understand that many modifications can be made to the invention previously described without significantly departing from the new teachings and advantages described here.

In particular, this invention may be applied to other technical fields such as ultrasound imaging by echography. It is in particular applicable to the field of SONAR (SOund Navigation And Ranging), which consists in:
- the transmission (by an antenna) of a sound pulse in water;
- the reception (by the antenna) of an echo wave corresponding to the reverberation of the sound pulse off the obstacles it encounters,
- the conversion (by the antenna) of the echo wave into an electrical reception signal (or echo signal), and
- the processing (by a remote computation unit) of the echo signal (transmitted by the antenna to the remote computing unit) to obtain a SONAR image.

In this SONAR field:
- a temporally short pulsed signal with a wide frequency band could be replaced by a plurality of excitation signals with narrow frequency bands, and
- the echo signals obtained for each of these narrowband excitation signals could be preprocessed (digitization, mixing with the central frequency of the narrowband excitation signal under consideration, low-pass filtering and decimation) in accordance with the different steps described above prior to transferring the preprocessed data toward the remote computing unit.

This technique can also be adapted to the field of radar which processes electromagnetic pulses instead of sound or ultrasound pulses, but remains within a same technical knowledge corpus, which is that of the transmission and reception of coherent waves of known and manageable phase.

Moreover, even if the preceding description describes this invention in the context of an imaging system comprising:
- an data acquiring probe 4,
- an external computing unit 5 for the reconstruction of images from data transmitted by the probe,
- a display unit 6 for displaying the reconstructed images, it will be obvious to those skilled in the art that the invention can be used with other types of imaging system, such as imaging systems in which the computing unit is integrated into the probe. In this case, the preprocessing steps previously described make it possible to limit the power consumed (by the probe) for the reconstruction of images.

The invention claimed is:

1. A method of processing acoustic or electromagnetic signals recorded by a receiver, said acoustic or electromagnetic signals being representative of acoustic or electromagnetic waves reflected by a medium to be studied after reflection off said medium of acoustic or electromagnetic waves transmitted by a transmitter to illuminate the medium to be studied, wherein said method comprises the following steps:
- a successive transmission, by the transmitter, of first and second waves in response to a successive application to the transmitter of first and second electrical excitation signals in first and second separate frequency bands contained in a range of excitation frequencies of the transmitter, the frequency band of each of the first and second electrical excitation signals, as measured based on a bandwidth at −6 dB, being less than a quarter of the frequency range of the transmitter,
- a reception, by the receiver, of first and second acoustic or electromagnetic echoes due to the respective reflections of the first and second waves at an interface of a target object contained in the medium to be studied, and a conversion of the first and second acoustic or electromagnetic echoes into respective first and second electrical reception signals,
- a pre-processing of the first and second electrical reception signals to obtain pre-processed signals, the pre-processing consisting in:
  - a digitization of the first and second electrical reception signals to obtain first and second digital signals,
  - at least one mixing of the first and second digital signals to obtain first and second mixed signals, wherein a mixing frequency of the first digital signal is different from a mixing frequency of the second digital signal,
  - at least one low-pass filtering of the first and second mixed signals to obtain first and second filtered signals, wherein a cut-off frequency of the low-pass filter, as measured based on a −6 dB bandwidth, is less than an eighth of the frequency range of the transmitter,
  - at least one decimation of the first and second filtered signals to obtain first and second decimated signals characterized by a flow rate of demodulated and decimated complex samples less than half the frequency range of the transmitter.

2. The method as claimed in claim 1, wherein for the step of pre-processing of the first and second electrical reception signals:
- each mixing frequency of the first digital signal is chosen equal to:
  - the center frequency of the first frequency band, or to
  - a harmonic of the first frequency band, or to
  - a sub-harmonic of the first frequency band,
- each mixing frequency of the second digital signal is chosen equal to:
  - the center frequency of the second frequency band, or to
  - a harmonic of the second frequency band, or to
  - a sub-harmonic of the second frequency band.

3. The method as claimed in claim 1, wherein the first and second electrical excitation signals each consist in an electrical signal of temporally apodized type.

4. The method as claimed in claim 1, wherein the transmitter is configured to transmit waves along different propagation directions, and wherein the step of successive transmission of the first and second waves includes sub-steps consisting in:
- transmitting the first wave only along a first direction, and
- transmitting the second wave only along a second direction different from the first direction.

5. The method as claimed in claim 1, wherein the transmitter includes a set of transducers extending linearly, and wherein the step of transmission of the first and second waves includes the sub-steps consisting in:
  transmitting the first wave from a first group of transducers of the set of transducers,
  transmitting the second wave from a second group of transducers of the set of transducers, the second group of transducers being different from the first group of transducers.

6. The method as claimed in claim 1, which further comprises a step of transmission, by the receiver, of the preprocessed signals toward a remote processing device.

7. The method as claimed in claim 1, wherein:
  the transmission step comprises the transmission of N waves in response to the successive application of N electrical excitation signals in N separate frequency bands contained in the frequency range of the transmitter, N being an integer greater than or equal to 3,
  the reception step comprises the receiving of N acoustic or electromagnetic echoes and their conversion into N respective electrical reception signals,
  the preprocessing step comprises:
    the digitization of the electrical reception N signals to obtain N digital signals,
    the mixing of each digital signal to obtain a mixed signal, wherein the mixing frequency of each digital signal is equal to the center frequency, to a harmonic or to a subharmonic of the frequency band of its associated excitation signal,
    the low-pass filtering of each mixed signal to obtain a filtered signal,
    the decimation of each filtered signal to obtain a decimated signal, and wherein the method further comprises a step of processing to obtain an image of the medium to be studied, wherein said processing step includes:
  a sub-step of formation of an elementary image based on each decimated signal, wherein said step of formation of an elementary image includes the computation of points extending over a 2D surface or a 3D volume using the information contained in the decimated signal,
  a sub-step of cross-modulation which consists in reporting each elementary image formed to a common reference frequency, and
  a sub-step of summation of the cross-modulated elementary images in order to obtain a final image of the medium to be studied.

8. A system for processing acoustic or electromagnetic signals recorded by a receiver, said acoustic or electromagnetic signals being representative of acoustic or electromagnetic waves reflected by a medium to be studied after reflection off said medium of acoustic or electromagnetic waves transmitted by a transmitter to illuminate the medium to be studied, wherein the system comprises:
  a controller to control:
    a successive transmission of first and second waves in response to a successive application to the transmitter of first and second electrical excitation signals in first and second separate frequency bands contained in a range of excitation frequencies of the transmitter, the frequency band of each of the first and second electrical excitation signals, as measured based on a −6 dB bandwidth, being less than a quarter of the frequency range of the transmitter,
    a reception, by the receiver, of first and second acoustic or electromagnetic echoes due to the respective reflections of the first and second waves at an interface of a target object contained in the medium to be studied, and a conversion of the first and second acoustic or electromagnetic echoes into respective first and second electrical reception signals,
  an acquiring unit for a preprocessing of the first and second electrical reception signals in order to obtain preprocessed signals, the preprocessing consisting in:
    a digitization of the first and second electrical reception signals to obtain first and second digital signals,
    a mixing of the first and second digital signals to obtain first and second mixed signals, a mixing frequency of the first digital signal being different from a mixing frequency of the second digital signal,
    a low-pass filtering of the first and second mixed signals to obtain first and second filtered signals, a cut-off frequency of the low-pass filter, as measured based on a bandwidth at −6 dB, being less than an eighth of the frequency range of the transmitter,
    a decimation of the first and second filtered signals to obtain first and second decimated signals characterized by a flow rate of complex demodulated and decimated samples less than half of the frequency range of the transmitter.

9. A non-transitory computer readable medium storing a program with code instructions for applying a method of processing of acoustic or electromagnetic signals recorded by a receiver, said acoustic or electromagnetic signals being representative of acoustic or electromagnetic waves reflected by a medium to be studied after reflection off said medium of acoustic or electromagnetic waves transmitted by a transmitter to illuminate the medium to be studied, wherein said method comprises the following steps:
  a successive transmission, by the transmitter, of first and second waves in response to a successive application to the transmitter of first and second electrical excitation signals in first and second separate frequency bands contained in a range of excitation frequencies of the transmitter, the frequency band of each of the first and second electrical excitation signals, as measured based on a bandwidth at −6 dB, being less than a quarter of the frequency range of the transmitter,
  a reception, by the receiver, of first and second acoustic or electromagnetic echoes due to the respective reflections of the first and second waves at an interface of a target object contained in the medium to be studied, and a conversion of the first and second acoustic or electromagnetic echoes into respective first and second electrical reception signals,
  a pre-processing of the first and second electrical reception signals to obtain pre-processed signals, the pre-processing consisting in:
    a digitization of the first and second electrical reception signals to obtain first and second digital signals,
    at least one mixing of the first and second digital signals to obtain first and second mixed signals, wherein a mixing frequency of the first digital signal is different from a mixing frequency of the second digital signal,
    at least one low-pass filtering of the first and second mixed signals to obtain first and second filtered signals, wherein a cut-off frequency of the low-pass filter, as measured based on a −6 dB bandwidth, is less than an eighth of the frequency range of the transmitter,
    at least one decimation of the first and second filtered signals to obtain first and second decimated signals characterized by a flow rate of demodulated and decimated complex samples less than half the frequency range of the transmitter.

10. The non-transitory computer readable medium according to claim 9, wherein for the step of pre-processing of the first and second electrical reception signals:
each mixing frequency of the first digital signal is chosen equal to:
the center frequency of the first frequency band, or to
a harmonic of the first frequency band, or to
a sub-harmonic of the first frequency band,
each mixing frequency of the second digital signal is chosen equal to:
the center frequency of the second frequency band, or to
a harmonic of the second frequency band, or to
a sub-harmonic of the second frequency band.

11. The non-transitory computer readable medium according to claim 9, wherein the first and second electrical excitation signals each consist in an electrical signal of temporally apodized type.

12. The non-transitory computer readable medium according to claim 9, wherein the transmitter is configured to transmit waves along different propagation directions, and wherein the step of successive transmission of the first and second waves includes sub-steps consisting in:
transmitting the first wave only along a first direction, and
transmitting the second wave only along a second direction different from the first direction.

13. The non-transitory computer readable medium according to claim 9, wherein the transmitter includes a set of transducers extending linearly, and wherein the step of transmission of the first and second waves includes the sub-steps consisting in:
transmitting the first wave from a first group of transducers of the set of transducers,
transmitting the second wave from a second group of transducers of the set of transducers, the second group of transducers being different from the first group of transducers.

14. The non-transitory computer readable medium according to claim 9, wherein the method further comprises a step of transmission, by the receiver, of the preprocessed signals toward a remote processing device.

15. The non-transitory computer readable medium according to claim 9, wherein:
the transmission step comprises the transmission of N waves in response to the successive application of N electrical excitation signals in N separate frequency bands contained in the frequency range of the transmitter, N being an integer greater than or equal to 3,
the reception step comprises the receiving of N acoustic or electromagnetic echoes and their conversion into N respective electrical reception signals,
the preprocessing step comprises:
the digitization of the electrical reception N signals to obtain N digital signals,
the mixing of each digital signal to obtain a mixed signal, wherein the mixing frequency of each digital signal is equal to the center frequency, to a harmonic or to a subharmonic of the frequency band of its associated excitation signal,
the low-pass filtering of each mixed signal to obtain a filtered signal,
the decimation of each filtered signal to obtain a decimated signal, and wherein the method further comprises a step of processing to obtain an image of the medium to be studied, wherein said processing step includes:
a sub-step of formation of an elementary image based on each decimated signal, wherein said step of formation of an elementary image includes the computation of points extending over a 2D surface or a 3D volume using the information contained in the decimated signal,
a sub-step of cross-modulation which consists in reporting each elementary image formed to a common reference frequency, and
a sub-step of summation of the cross-modulated elementary images in order to obtain a final image of the medium to be studied.

* * * * *